US008888189B2

(12) United States Patent
Tamura et al.

(10) Patent No.: US 8,888,189 B2
(45) Date of Patent: Nov. 18, 2014

(54) VEHICLE FOOTREST SYSTEM

(75) Inventors: Hiroshi Tamura, Toyota (JP); Hideki Kobayashi, Nishikamo-gun Aichi (JP); Shinji Fujita, Tougou-cho Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 198 days.

(21) Appl. No.: 13/643,274

(22) PCT Filed: Apr. 26, 2010

(86) PCT No.: PCT/JP2010/057376
§ 371 (c)(1),
(2), (4) Date: Oct. 24, 2012

(87) PCT Pub. No.: WO2011/135651
PCT Pub. Date: Nov. 3, 2011

(65) Prior Publication Data
US 2013/0038107 A1 Feb. 14, 2013

(51) Int. Cl.
| A47C 13/00 | (2006.01) |
| A47C 7/62 | (2006.01) |
| A47C 7/50 | (2006.01) |
| B60N 3/06 | (2006.01) |
| B60N 2/44 | (2006.01) |
| B60N 2/02 | (2006.01) |
| B60N 2/20 | (2006.01) |
| B60N 2/06 | (2006.01) |

(52) U.S. Cl.
CPC .............. *B60N 3/06* (2013.01); *B60N 2/4495* (2013.01); *B60N 2/0232* (2013.01); *B60N 2/20* (2013.01); *B60N 2/067* (2013.01)
USPC .................. 297/423.19; 297/112; 297/188.04; 297/423.15

(58) Field of Classification Search
CPC ...... A47C 16/02; A47C 16/025; A47C 1/034; A47C 7/50; B60N 2/206; B60N 2/32; B60N 2/4495; B60N 3/06; B60N 3/063; B60N 3/066
USPC .................. 297/125, 188.02, 188.04, 188.05, 297/423.15, 423.19, 423.26, 423.28, 112, 297/331
See application file for complete search history.

(56) References Cited

U.S. PATENT DOCUMENTS 2,274,176 A * 2/1942 Widman .................. 297/423.15
3,761,124 A * 9/1973 Weik et al. .................... 297/112
(Continued)

FOREIGN PATENT DOCUMENTS

| JP | 59-102537 U | 7/1984 |
| JP | 59-206244 A | 11/1984 |

(Continued)

*Primary Examiner* — Ryan Kwiecinski
(74) *Attorney, Agent, or Firm* — Gifford, Krass, Sprinkle, Anderson & Citkowski, P.C.

(57) ABSTRACT

A vehicle footrest system allows an occupant seated in a rear seat to brace their feet and that is capable of inhibiting load from concentrating at the heels of an occupant. A footrest system is provided with: a reclining device that rotates an upper end part side of a seatback in the direction of arrow A and holds it at a predetermined angle of rotation; and a slide device that slides a front seat in the direction of arrow B with respect to a vehicle body floor. When an occupant seated in a rear seat uses a footrest portion of the seatback, the reclining device is operated and the upper end part side of the seatback is inclined toward the vehicle front side. Further, the slide device is operated and a slide portion of a seat cushion is moved in a vehicle front-rear direction along a rail portion.

12 Claims, 19 Drawing Sheets

(56) References Cited

U.S. PATENT DOCUMENTS

| | | | |
|---|---|---|---|
| 5,295,732 A * | 3/1994 | Boisset | 297/452.1 |
| 5,954,395 A * | 9/1999 | Moulins et al. | 297/218.4 |
| 6,199,948 B1 * | 3/2001 | Bush et al. | 297/217.3 |
| 6,283,529 B2 * | 9/2001 | Kitagawa | 296/75 |
| 7,658,153 B1 * | 2/2010 | Patoka | 108/44 |
| 8,474,917 B2 * | 7/2013 | Line et al. | 297/452.38 |
| 8,727,418 B2 * | 5/2014 | Miller | 296/75 |
| 2002/0096930 A1 | 7/2002 | Bellvis Castillo | |
| 2008/0252111 A1 * | 10/2008 | Rothkop et al. | 297/188.04 |
| 2010/0109387 A1 * | 5/2010 | Merensky | 297/75 |
| 2010/0207430 A1 * | 8/2010 | Kolich et al. | 297/112 |
| 2014/0132040 A1 * | 5/2014 | Arakawa et al. | 297/112 |

FOREIGN PATENT DOCUMENTS

| | | |
|---|---|---|
| JP | 63-078839 A | 4/1988 |
| JP | 7-024641 U | 5/1995 |
| JP | 11-240365 A | 9/1999 |
| JP | 2003-509095 A | 3/2003 |
| JP | 2003-312352 A | 11/2003 |
| JP | 2005-289133 A | 10/2005 |
| JP | 2008-074122 A | 4/2008 |
| JP | 2008-105607 A | 5/2008 |
| JP | 2008-239013 A | 10/2008 |
| JP | 2009-035152 A | 2/2009 |
| JP | 2009-073241 A | 4/2009 |

* cited by examiner

VEHICLE FOOTREST SYSTEM

TECHNICAL FIELD

The present invention relates to a vehicle footrest system.

BACKGROUND ART

A structure is disclosed in Japanese Patent Application Laid-Open (JP-A) No. 2009-73241 in which the back face of a front seat seatback is employed as a footrest with the front seat seatback tilted towards the seat cushion side to a substantially horizontal position.

DISCLOSURE OF INVENTION

Technical Problem

However, in JP-A No. 2009-73241 no consideration is given to use while travelling, and an occupant seated in a rear seat is not able to brace their feet when resting them on the back face of the front seat seatback. Load is also concentrated on the heels of an occupant, which is uncomfortable, leaving room for improvement.

In consideration of the above circumstances, an object of the present invention is to obtain a vehicle footrest system allowing an occupant seated in a rear seat to brace their feet when a footrest section is employed during travelling, and capable of suppressing load from concentrating at the heels of an occupant.

Solution to Problem

A vehicle footrest system of a first aspect of the present invention includes: a rear side seat disposed at a vehicle compartment rear side; a front side seat disposed at a vehicle compartment front side of the rear side seat and equipped with an upright seatback provided at a vehicle front-rear direction rear end portion of a seat cushion capable of being sat on by an occupant; a tilting unit that tilts the seatback towards the vehicle front side with respect to the seat cushion as far as a foot-sole angle of an occupant seated in the rear side seat and retains an upper end portion of the seatback in a tilted state sloping diagonally towards the vehicle front and the vehicle top with respect to a bottom end portion of the seatback; a footrest section provided at a back face of the seatback and provided along the back face on which to rest the feet of the occupant seated in the rear side seat; and a moving unit for moving the seatback in the vehicle front-rear direction with respect to a vehicle body floor with the seatback in a state tilted towards the vehicle front side by the tilting unit. In the vehicle footrest system, an indented portion is provided at the footrest section into which feet of the occupant seated in the rear side seat are inserted, and the footrest section is equipped with a movable section that is supported in a recess shaped portion provided in the back face of the seatback so as to be capable of moving in the vehicle front-rear direction, and that forms the indented portion by moving the footrest section towards the vehicle front side in a state in which the seatback has been tilted towards the vehicle front side by the tilting unit.

A vehicle footrest system of a third aspect of the present invention is the vehicle footrest system of the first aspect in which the footrest section includes a load bearing portion that supports the heels of the occupant seated in the rear side seat.

A vehicle footrest system of a fourth aspect of the present invention is the vehicle footrest system of the first aspect or the third aspect in which: the tilting unit includes a drive section that electrically operates the seatback; and the vehicle footrest system further includes an operating section that is provided at a position enabling operation by the occupant seated in the rear side seat and that actuates the tilting unit, and a control unit that controls actuation of the tilting unit based on operation of the operating section.

A vehicle footrest system of a fifth aspect of the present invention is the vehicle footrest system of the first aspect, the third aspect or the fourth aspect in which a cover member is provided at the footrest section, the cover member being supported so as to be capable of opening towards the vehicle rear side from a closed state in which the footrest section is covered.

A vehicle footrest system of an eighth aspect of the present invention is the vehicle footrest system of the first aspect in which the movable section is configured to move in response to a thrusting force of an occupant.

A vehicle footrest system of a ninth aspect of the present invention is the vehicle footrest system of the first aspect in which the movable section is configured to move in conjunction with an operation by the tilting unit that tilts the seatback towards the vehicle front side.

A vehicle footrest system of a tenth aspect of the present invention is the vehicle footrest system of the first aspect in which the movable section is configured to move in conjunction with an operation that opens a cover member provided at the footrest section towards the vehicle rear side from a closed state in which the footrest section is covered.

A vehicle footrest system of an eleventh aspect of the present invention is the vehicle footrest system of the fifth aspect in which at least one of the footrest section and/or the cover member is provided with a heater for warming the feet of the occupant seated in the rear side seat.

A vehicle footrest system of a twelfth aspect of the present invention is the vehicle footrest system of any one aspect of the first aspect, the third aspect to the fifth aspect, or the eighth aspect to the eleventh aspect in which the footrest section includes a massage unit for massaging the soles of the feet of the occupant seated in the rear side seat.

A vehicle footrest system of a thirteenth aspect of the present invention is the vehicle footrest system of any one aspect of the first aspect, the third aspect to the fifth aspect, or the eighth aspect to the twelfth aspect that further includes a swing unit that swings a vehicle upper side end portion of the seatback in the vehicle front-rear direction about a pivot center at a vehicle lower side end portion of the seatback.

A vehicle footrest system of a fourteenth aspect of the present invention is the vehicle footrest system of any one of the first aspect, the third aspect to the fifth aspect, or the eighth aspect to the thirteenth aspect that further includes: a load sensor that is provided at the rear side seat and that detects the physique of the occupant seated in the rear side seat; and a control unit that controls operation of the tilting unit and the moving unit based on the physique of the occupant detected by the load sensor so as to tilt the seatback towards the vehicle front side to a pre-stored specific position and so as to move the seatback with respect to the vehicle body floor to a vehicle front-rear direction pre-stored specific position.

A vehicle footrest system of a fifteenth aspect of the present invention is the vehicle footrest system of any one aspect of the first aspect, the third aspect to the fifth aspect, or the eighth aspect to the fourteenth aspect in which the rear side seat includes: an ottoman provided at a vehicle front-rear direction front end portion of a seat cushion capable of being sat on by an occupant, the ottoman being supported such that a vehicle front side end portion of the ottoman is capable of being flipped up towards the vehicle upper side about a pivot center at a vehicle rear side end portion of the ottoman; an ottoman moving unit that moves the vehicle front side end portion of the ottoman towards the vehicle upper side; and an ottoman control unit that controls the ottoman moving unit such that the vehicle front end portion of the ottoman is moved towards the vehicle upper side when the seatback is tilted towards the vehicle front side.

According to the vehicle footrest system of the first aspect of the present invention, in a state in which an occupant is seated in the rear side seat, the seatback of the front side seat disposed at the vehicle compartment front side of the rear side seat is retained by the tilting unit in a state tilted towards the vehicle front side with respect to the seat cushion of the front side seat as far as the foot-sole angle of the occupant seated in the rear side seat. When this occurs, the upper end portion of the seatback is retained by the tilting unit in a tilted state sloping diagonally towards the vehicle front and the vehicle top with respect to a bottom end portion of the seatback. In this state, the feet of the occupant seated in the rear side seat can be rested on the footrest section provided at the back face of the seatback and provided along the back face. Accordingly, the entire soles or substantially the entire soles of the feet of the occupant seated in the rear side seat can be placed in contact with the footrest section when the footrest section is being used while traveling. The occupant can therefore brace their feet against the footrest section and load can be inhibited from concentrating at the heels of the occupant.

Moreover, the footrest section can be moved to the most appropriate position on the vehicle front side adjusted in accordance with the physique of the occupant seated in the rear seat by using the moving unit to move the seatback in the vehicle front-rear direction with respect to the vehicle body floor with the seatback in a state tilted towards the vehicle front side. The indented portion is also provided at the footrest section, into which the feet of the occupant seated in the rear side seat are inserted. The legroom of the occupant is thereby increased. Moreover, the indented portion is formed by the movable section moving the footrest section towards the vehicle front side inside the recess shaped portion of the seatback in a state in which the seatback has been tilted towards the vehicle front side by the tilting unit. The legroom of the occupant can thereby be increased when the footrest section is in use, and aesthetic appeal can be enhanced by the footrest section being returned by the movable section to its original position when the footrest section is not in use.

According to the vehicle footrest system of the third aspect of the present invention the heels of the occupant are supported by the load bearing portion provided to the footrest section in a state in which the feet of the occupant seated in the rear seat are rested on the footrest section. The feet of the occupant can be prevented from slipping off the footrest section by the load bearing portion.

According to the vehicle footrest system of the fourth aspect of the present invention, when the occupant seated in the rear side seat operates the operating section, the drive section of the tilting unit electrically operates the seatback of the front side seat, and tilts the seatback towards the vehicle front side to the foot-sole angle of the occupant seated in the rear side seat. The ease-of-operation from the rear side seat is thereby enhanced.

According to the vehicle footrest system of the fifth aspect of the present invention, when the footrest section is being used, the cover member opens from the closed state covering the footrest section towards the vehicle rear side. By opening the cover member the occupant seated at the rear side seat can rest their feet on the footrest section. By providing the cover member covering the footrest section, the footrest section is not exposed when the footrest section is soiled, enhancing the aesthetic appeal. Feet resting on the footrest section are also more difficult to notice from the periphery due to the cover member when feet are rested on the footrest section.

According to the vehicle footrest system of the eighth aspect of the present invention, the movable section is configured to move under pressing-in force of an occupant, enabling the legroom of the occupant to be increased with a simple configuration.

According to the vehicle footrest system of the ninth aspect of the present invention, the movable section is configured such that movement is coupled to operation by the tilting unit tilting the seatback towards the vehicle front side, enhancing the ease-of-operation when moving the footrest section towards the vehicle front side.

According to the vehicle footrest system of the tenth aspect of the present invention, the movable section is configured to move coupled to operation to open the cover member from a closed state covering the footrest section towards the vehicle rear side, enhancing the ease-of-operation when moving the footrest section towards the vehicle front side.

According to the vehicle footrest system of the eleventh aspect of the present invention, at least one of the footrest section and/or the cover member is provided with a heater, and so the feet of the occupant seated in the rear side seat rested on the footrest section can be warmed.

According to the vehicle footrest system of the twelfth aspect of the present invention, the massage unit is included in the footrest section, and so the soles of the feet of the occupant seated in the rear side seat rested on the footrest section can be massaged.

According to the vehicle footrest system of the thirteenth aspect of the present invention, in a state in which the feet of the occupant seated in the rear side seat are rested on the footrest section of the seatback, the vehicle top side end portion of the seatback is swung in the vehicle front-rear direction about a pivot center of a vehicle bottom side end portion of the seatback by the swing unit. The foot portion can thereby be moderately moved in a state in which an occupant is seated in the rear side seat.

According to the vehicle footrest system of the fourteenth aspect of the present invention, the frame of the occupant seated in the rear side seat is detected by the load sensor provided to the rear side seat. Operation of the tilting unit and the moving unit is then controlled by the control unit based on the frame of the occupant detected by the load sensor, so as to tilt the seatback towards the vehicle front side to a pre-stored specific position and so as to move the seatback with respect to the vehicle body floor in the vehicle front-rear direction to a pre-stored specific position. The ease-of-operation when using the footrest section is thereby enhanced.

According to the vehicle footrest system of the fifteenth aspect of the present invention, when the seatback of the front side seat is tilted towards the vehicle front side, the ottoman moving unit is controlled by the control unit, such that the vehicle front side end portion of the ottoman is moved towards the vehicle top side about the pivot center of the vehicle rear side end portion of the ottoman, and the vehicle front side end portion is retained in a flipped up state to the vehicle top side. The legs of the occupant seated in the rear side seat are thereby supported by the ottoman, enhancing the comfort when using the footrest section. The ease-of-operation is also enhanced by moving the ottoman when the seatback of the front side seat is tilted towards the vehicle front side.

Advantageous Effects of Invention

As explained above, the vehicle footrest system of the first aspect of the present invention exhibits the excellent advantageous effect of enabling the occupant seated in the rear seat to brace their feet against the footrest section when using the footrest section during travelling, and enabling load to be suppressed from concentrating at the heels of the occupant.

The vehicle footrest system of the first aspect of the present invention also exhibits the excellent advantageous effect of enabling the footrest section to be moved to the most appropriate vehicle front-rear direction position in accordance with the physique of the occupant seated in the rear side seat.

The vehicle footrest system of the first aspect of the present invention also exhibits the excellent advantageous effect of increasing the legroom of the occupant during use of the footrest section and also enhancing aesthetic appeal when the footrest section is not in use.

The vehicle footrest system of the third aspect of the present invention exhibits the excellent advantageous effect of enabling the feet of the occupant to be prevented from slipping off the footrest section.

The vehicle footrest system of the fourth aspect of the present invention exhibits the excellent advantageous effect of enhancing the ease-of-operation from the rear side seat.

The vehicle footrest system of the fifth aspect of the present invention exhibits the excellent advantageous effect of enhancing the aesthetic appeal due to the cover member of the footrest section.

The vehicle footrest system of the eighth aspect of the present invention exhibits the excellent advantageous effect of enabling the legroom of the occupant to be increased with a simple configuration.

The vehicle footrest system of the ninth aspect of the present invention exhibits the excellent advantageous effect of enhancing the ease-of-operation when moving the footrest section is to the vehicle front side.

The vehicle footrest system of the tenth aspect of the present invention exhibits the excellent advantageous effect of enhancing ease-of-operation when moving the footrest section towards the vehicle front side by coupling to the opening operation of the cover member.

The vehicle footrest system of the eleventh aspect of the present invention exhibits the excellent advantageous effect of enabling the feet of the occupant seated in the rear side seat to be warmed.

The vehicle footrest system of the twelfth aspect of the present invention exhibits the excellent advantageous effect of enabling the soles of the feet of the occupant seated in the rear side seat to be massaged.

The vehicle footrest system of the thirteenth aspect of the present invention exhibits the excellent advantageous effect of enabling the foot portion to thereby be moderately moved in a state in which an occupant is seated in the rear side seat.

The vehicle footrest system of the fourteenth aspect of the present invention exhibits the excellent advantageous effect of enhancing the ease-of-operation when using the footrest section.

The vehicle footrest system of the fifteenth aspect of the present invention exhibits the excellent advantageous effect of enhancing the comfort and ease-of-operation by the ottoman moving to a position supporting the legs of the occupant seated in the rear side seat when the footrest section is used.

BEST MODE FOR CARRYING OUT THE INVENTION

Figure 1:
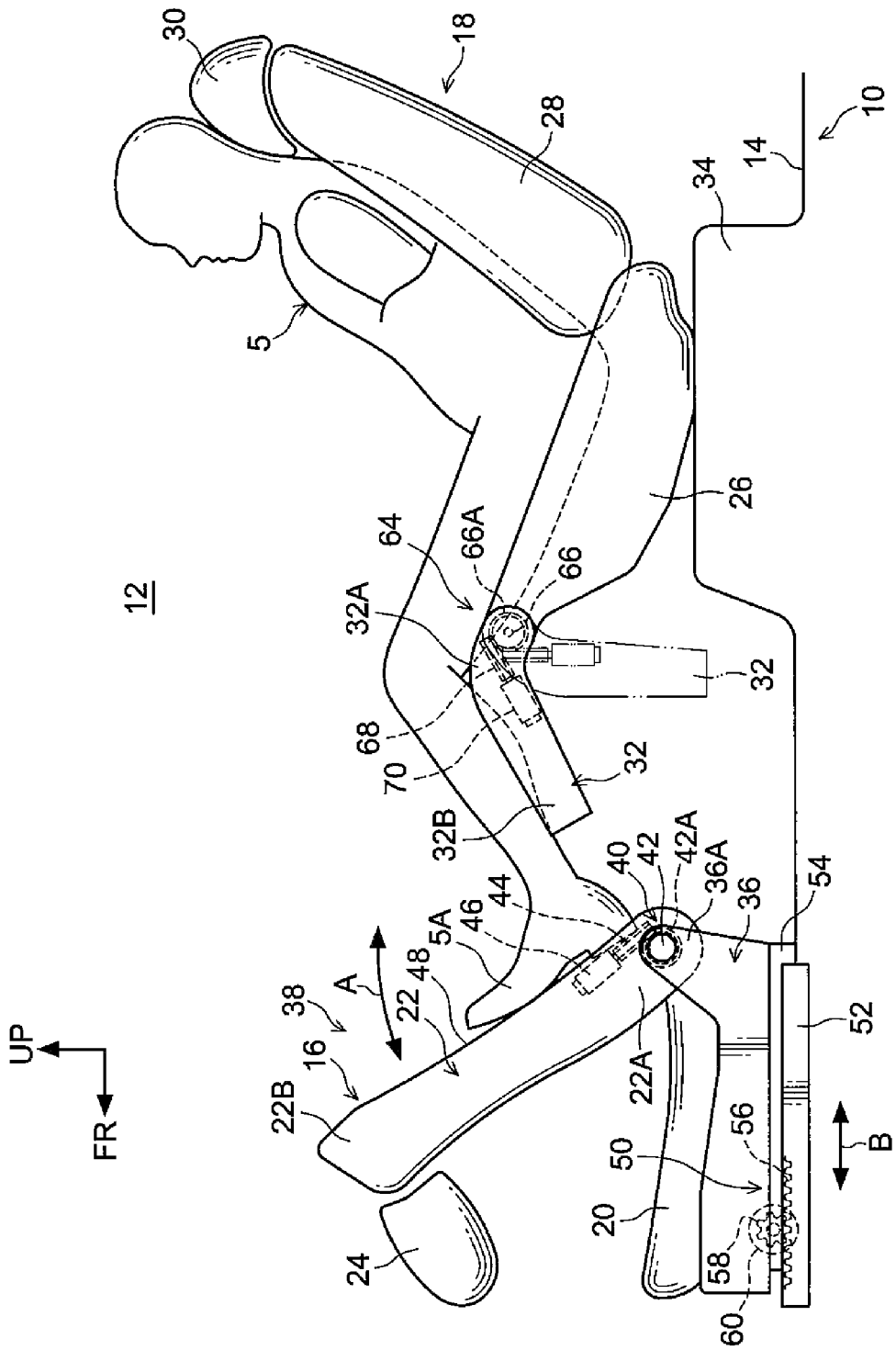
FIG. 1 is a side view illustrating an overall configuration of a vehicle footrest system according to a first exemplary embodiment, showing a state in which the seatback of a front seat is being used as a footrest section.
Figure 2:
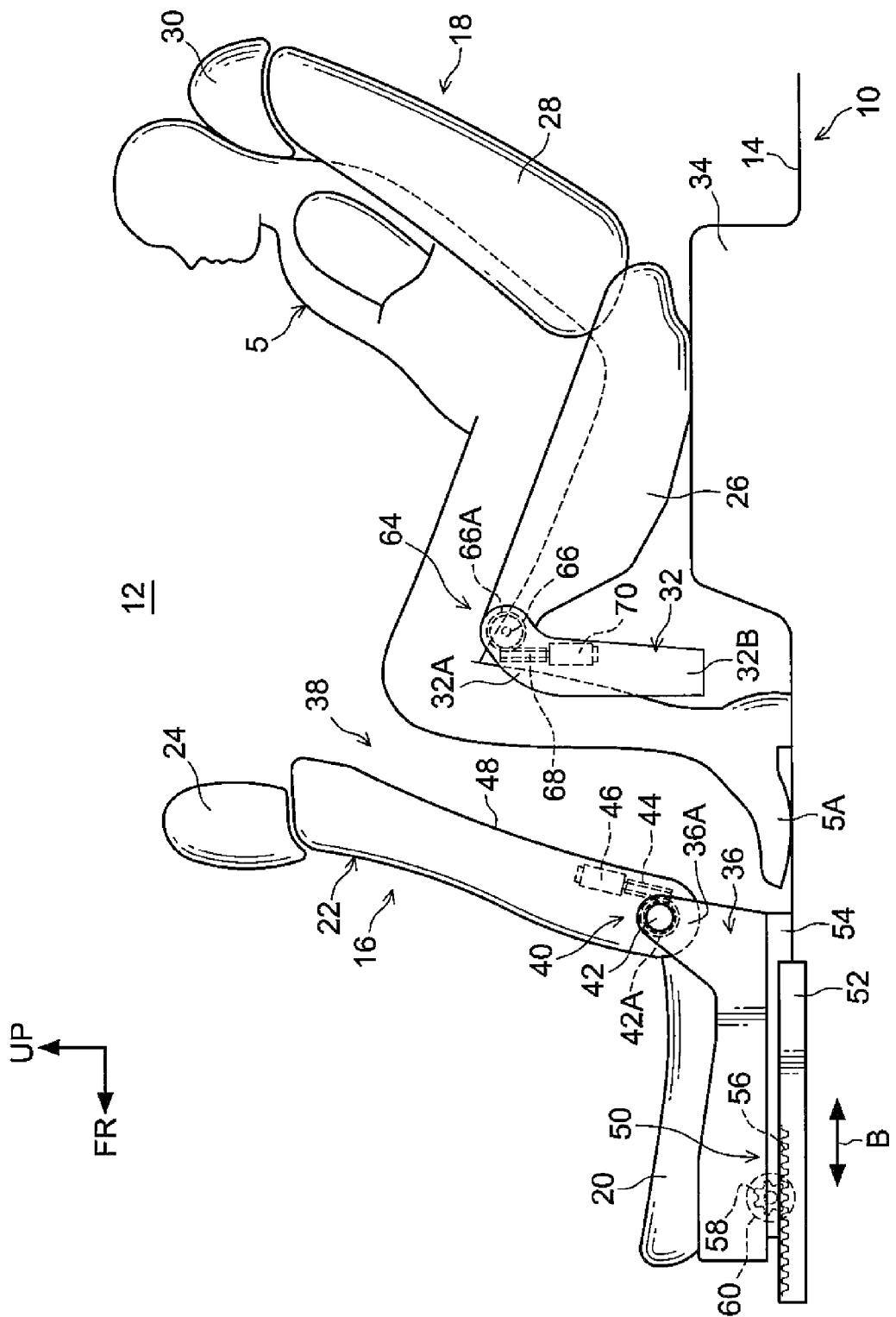
FIG. 2 is a side view illustrating an overall configuration of a vehicle footrest system according to the first exemplary embodiment, showing a normal state for a front seat.

Explanation follows regarding a first exemplary embodiment of a vehicle footrest system according to the present invention, with reference to FIG. 1 and FIG. 2. Note that in the drawings the arrow FR indicates a vehicle front direction, the arrow UP indicates the vehicle top side, and the arrow OUT indicates the vehicle width direction outside, as appropriate.

FIG. 1 is a side view of a vehicle footrest system according to the present exemplary embodiment, illustrating a state in which a seatback of a front seat is being employed as a footrest. FIG. 2 is a side view illustrating a normal state of a front seat of a vehicle footrest system. As shown in these figures, a front seat 16 is installed as a front side seat at the vehicle front-rear direction front side of a vehicle body floor 14 provided inside a vehicle compartment 12 of a vehicle 10. A rear seat 18 is installed as a rear side seat at the vehicle front-rear direction rear side of the front seat 16. The front seat 16 is installed at a position facing towards a front door opening section formed in a main body of the vehicle 10, and the rear seat 18 is installed at a position facing towards a rear door opening section formed in the main body of the vehicle 10.

The front seat 16 is equipped with a seat cushion 20 for supporting the bottom and thigh regions of a seated occupant, a seatback 22 provided along the top-bottom direction at a vehicle front-rear direction rear edge portion of the seat cushion 20 for supporting the back region of the occupant, and a headrest 24 provided at the top edge portion of the seatback 22 for supporting the head of the occupant.

Similarly, the rear seat 18 is equipped with a seat cushion 26 for supporting the bottom and thigh regions of a seated occupant, a seatback 28 provided along the top-bottom direction at a vehicle front-rear direction rear edge portion of the seat cushion 26, and a headrest 30 provided at the top edge portion of the seatback 28 for supporting the head of the occupant. The rear seat 18 is also equipped with an ottoman 32 at the vehicle front-rear direction front edge portion of the seat cushion 26. The seat cushion 26 is supported on a rectangular shaped raised section 34 projecting out from the vehicle body floor 14 towards the vehicle top side.

A footrest system 38 (vehicle footrest system) is provided to the front seat 16 for an occupant 5 seated on the rear seat 18 to rest their feet 5A on the seatback 22. The footrest system 38 is equipped with a reclining device 40 serving as a tilting unit that tilts (pivots) a top edge portion 22B side of the seatback 22 in the vehicle front-rear direction (arrow A directions) to a specific angle and retains the top edge portion 22B at the specific angle, and a sliding device 50 serving as a moving unit that slides the front seat 16 with respect to the vehicle body floor 14 in the vehicle front-rear direction (arrow B directions).

The seat cushion 20 of the front seat 16 is supported on seat cushion frames 36 disposed at the two vehicle width direction sides along the vehicle front-rear direction. Projection portions 36A are formed extending out to the vehicle top side from vehicle rear direction end portions of the seat cushion frames 36. The reclining device 40 is provided to a portion coupling between the projection portions 36A and a bottom edge portion 22A of the seatback 22.

The reclining device 40 is equipped with a hinge section 42 serving as a pivoting unit provided to the projection portions 36A to support the bottom edge portion 22A of the seatback 22 so as to be capable of pivoting, a gear 44 that meshes with a gear 42A provided at the periphery of the hinge section 42, and a drive section 46 that actuates the gear 44. The gear 44 rotates when driving force from the drive section 46 is transmitted thereto, thereby rotating the gear 42A of the hinge section 42. The bottom edge portion 22A of the seatback 22 is thereby pivoted about the hinge section 42 so as to tilt the top edge portion 22B side of the seatback 22 to a specific angle. The reclining device 40 retains, namely fixes (puts into a locked state), the top edge portion 22B side of the seatback 22 in the state tilted to the specific angle by the hinge section 42. The reclining device 40 is provided with an operation section, not shown in the drawings, for actuating the drive section 46. The top edge portion 22B side of the seatback 22 is pivoted in the vehicle front-rear direction (the arrows A direction) by operating the operation section.

In the present exemplary embodiment, using the reclining device 40, the top edge portion 22B side of the seatback 22 is retained in a state pivoted to the vehicle front side as far as a foot-sole angle of the feet 5A of the occupant 5 seated in the rear seat 18 (a position contactable with substantially the entire soles of the feet). A footrest section 48 for resting the feet 5A of the occupant 5 seated in the rear seat 18 on is provided on the back face of the seatback 22. The tilting angle of the footrest section 48 of the seatback 22 is adjustable using the reclining device 40. The state in which the seatback 22 has been pivoted to the vehicle front side as far as the foot-sole angle is, specifically, a tilted state in which the top edge portion 22B side of the seatback 22 is tilted in a diagonal direction towards the vehicle front and vehicle top with respect to the bottom edge portion 22A (a state in which the seatback 22 is not horizontal). This can be referred to as a state in which it is possible for substantially the entire soles of the feet to make contact with the footrest section 48 when the occupant 5 seated in the rear seat 18 has rested their feet 5A on the seatback 22.

The sliding device 50 is provided at the bottom portion side of the seat cushion 20 and is configured to slide the front seat 16 in the vehicle front-rear direction (the arrows B direction) with respect to the vehicle body floor 14. The sliding device 50 is equipped with: a rail section 52 provided to the vehicle body floor 14 and running along the vehicle front-rear direction, a sliding section 54 that is provided at a bottom end portion of the seat cushion 20 and inserted into the rail section 52 so as to be slidable, a rack 56 provided to the vehicle body floor 14 substantially parallel to the rail section 52, a pinion 58 provided to a frame of the seat cushion 20 and meshing with the rack 56, and a drive section 60 that rotates the pinion 58 in both directions.

In the sliding device 50, the pinion 58 is rotated by the drive section 60, and the pinion 58 moves while meshing with the rack 56, thereby moving the sliding section 54 of the seat cushion 20 along the rail section 52. It is accordingly possible to move the footrest section 48 of the seatback 22 to an appropriate vehicle front-rear direction position with the top edge portion 22B side of the seatback 22 in a tilted (pivoted) state to the vehicle front side as far as the foot-sole angle of the feet 5A of the occupant 5 seated in the rear seat 18. The operating section, not shown in the drawings, for operating the drive section 60 is provided to the sliding device 50, such that the seat cushion 20 is moved in the vehicle front-rear direction (the arrow B direction) by operating the operating section.

The footrest system 38 is equipped with an ottoman moving device 64 (ottoman moving unit) for supporting a front edge portion 32B of the ottoman 32 so as to be capable of flipping up towards the vehicle top side. The ottoman moving device 64 is installed to a portion coupling between the seat cushion 26 of the rear seat 18 and a rear edge portion 32A of the ottoman 32. The ottoman moving device 64 is equipped with a hinge section 66 that is provided to a front end portion of the seat cushion 26 and that supports the rear edge portion 32A of the ottoman 32 so as to be capable of pivoting, a gear 68 that meshes with a gear 66A provided at the periphery of the hinge section 66 and a drive section 70 that actuates the gear 68.

When driving force is transmitted from the drive section 70, the gear 68 rotates, thereby rotating the gear 66A of the hinge section 66. The rear edge portion 32A of the ottoman 32 is accordingly pivoted about the hinge section 66, such that the front edge portion 32B side of the ottoman 32 is retained in a state pivoted (flipped up) towards the vehicle top side at a specific angle. The ottoman moving device 64 is provided with an operation section, not shown in the drawings, that actuates the drive section 70, such that the front edge portion 32B side of the ottoman 32 is pivoted about the hinge section 66 by operating the operation section. The pivot angle of the ottoman 32 is adjustable using the ottoman moving device 64.

In the normal state of the front seat 16 (a state in which the footrest system 38 is not being used), the seatback 22 is provided extending towards the vehicle top side with an angle of greater than 90 degrees with respect to the seat cushion 20. The headrest 24 is supported so as to be capable of pivoting at the vehicle front side of the seatback 22 by a hinge member, not shown in the drawings.

Explanation next follows regarding operation and advantageous effects of the present exemplary embodiment.

As shown in FIG. 2, in the normal state of the front seat 16 (the state in which the footrest system 38 is not being used), the seatback 22 is provided extending towards the vehicle top side with an angle of greater than 90 degrees with respect to the seat cushion 20. The rear seat 18 is in a state with the front edge portion 32B side of the ottoman 32 rotated towards the vehicle bottom side with respect to the seat cushion 26.

In order to use the footrest system 38, the occupant 5 seated in the rear seat 18, as shown in FIG. 1, operates the reclining device 40 and tilts (pivots) the top edge portion 22B side of the seatback 22 towards the vehicle front side. When this is performed, a state is maintained in which the footrest section 48 of the back face of the seatback 22 is tilted as far as the foot-sole angle of the feet 5A of the occupant 5 seated in the rear seat 18. Note that the headrest 24 is pivoted towards the vehicle front side with respect to the seatback 22 by a hinge member, not shown in the drawings.

The sliding device 50 is operated and the sliding section 54 of the front seat 16 is moved in the vehicle front-rear direction (for example to the vehicle front side) along the rail section 52. The footrest section 48 of the seatback 22 is thereby disposed in a state tilted as far as the foot-sole angle of the feet 5A of the occupant 5 seated in the rear seat 18, and the footrest section 48 of the seatback 22 can be moved to an appropriate position in the vehicle front-rear direction with respect to the rear seat 18.

Note that in the above example, after the top edge portion 22B side of the seatback 22 has been tilted towards the vehicle front using the reclining device 40, the seat cushion 20 is moved towards the vehicle front using the sliding device 50, however the seatback 22 may be tilted after moving the seat cushion 20 in the vehicle front-rear direction.

In this state, the occupant 5 seated on the rear seat 18 can rest their feet 5A on the footrest section 48 of the seatback 22. The footrest section 48 of the seatback 22 can also be moved in the vehicle front-rear direction using the sliding device 50, and so the footrest section 48 of the seatback 22 can be adjusted to the optimum position for the frame of the occupant 5. The distance from the seated position of the occupant 5 seated on the rear seat 18 to the position of the feet 5A on the footrest section 48 therefore does not become too short (ample distance can be achieved from the seated position of the occupant 5 to the feet 5A position), enabling a comfortable posture to be maintained.

When the occupant 5 seated on the rear seat 18 uses the footrest section 48 during travel of the vehicle 10, the entire or substantially the entire soles of the feet of the occupant 5 seated on the rear seat 18 are in contact with the footrest section 48. It is therefore possible for the occupant 5 to brace their feet 5A resting on the footrest section 48, and load can be suppressed from being concentrated at the heels of the occupant 5.

The ottoman moving device 64 is also operated to pivot the front edge portion 32B side of the ottoman 32 towards the vehicle top side about the hinge section 66, and to retain a state in which the front edge portion 32B of the ottoman 32 is flipped up. The vicinity of the calves of the legs 5B of the occupant 5 seated on the rear seat 18 is accordingly supported by the ottoman 32, enhancing comfort.

In the present exemplary embodiment, the drive section 46 is provided for electrical operation of the reclining device 40, the drive section 60 is provided for electrical operation of the sliding device 50, and the drive section 70 is provided for electrical operation of the ottoman moving device 64. However, there is no limitation thereto and configuration may be made with the reclining device 40, the sliding device 50 and the ottoman moving device 64 manually operated.

The configuration of the drive section for each device (for example the rack 56 and the pinion 58) is not limited to the present exemplary embodiment, and changes may be made to other configurations. The ottoman 32 may or may not be included, and configuration may be made with a non-pivoting headrest 24. The front seat 16 and the rear seat 18 may also be provided with additional control to enable vehicle top-bottom direction adjustment by providing seat lifters.

The ottoman 32 pivots the front edge portion 32B side towards the vehicle top side about the hinge section 66, however the ottoman 32 may be moved towards the vehicle front side while also pivoting the front edge portion 32B side of the ottoman 32 towards the vehicle top side.

Note that in the rear seat 18, the front end portion and the rear end portion of the seat cushion 26 are normally in a substantially horizontal state along the vehicle front-rear direction; however, a pivoting unit may be provided to pivot the front end portion of the seat cushion 26 towards the vehicle top side with respect to the rear end portion.

Figure 3:
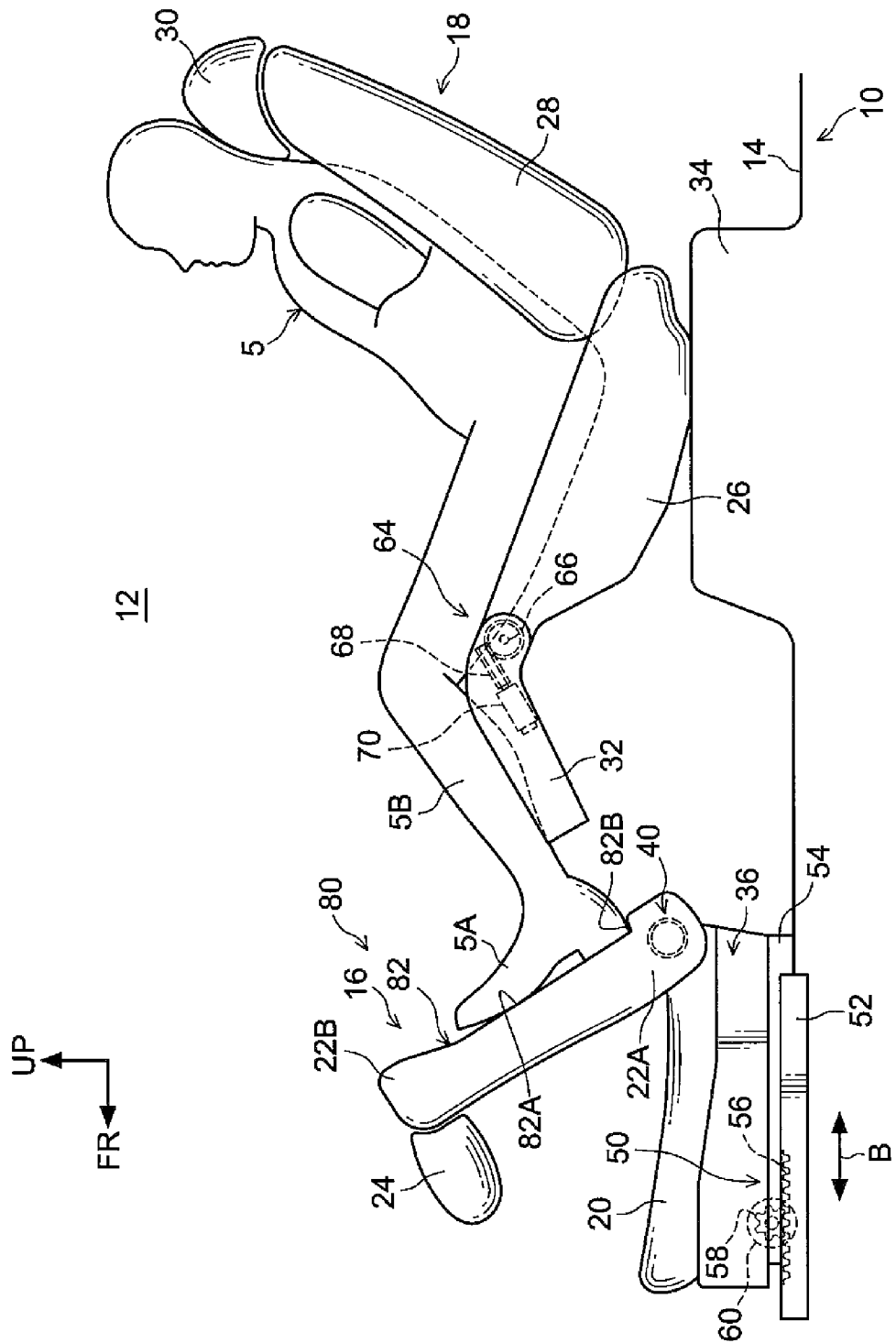
FIG. 3 is a side view illustrating an overall configuration of a vehicle footrest system according to a second exemplary embodiment, showing a state in which the seatback of a front seat is being used as a footrest section.

Explanation follows regarding a second exemplary embodiment of a vehicle footrest system according to the present invention, with reference to FIG. 3. Note that similar configuration portions to those of the first exemplary embodiment are allocated the same reference numerals and further explanation is omitted.

As shown in FIG. 3, a footrest system 80 is equipped with a footrest section 82 provided on the back face of a seatback 22 of the front seat 16. The footrest section 82 is equipped with a substantially flat plane shaped wall face portion 82A on which the feet 5A of an occupant 5 seated on the rear seat 18 are rested, and a load bearing portion 82B that projects out towards the vehicle rear side from the bottom edge portion of the wall face portion 82A. The heels of the feet 5A are supported by the load bearing portion 82B at the bottom edge of the wall face portion 82A when the occupant 5 seated in the rear seat 18 rests the feet 5A on the wall face portion 82A of the footrest section 82. The downwards acting load of the feet 5A can be borne by the load bearing portion 82B, and the legs of the occupant 5 are prevented from sliding off the footrest section 82.

Figure 4:
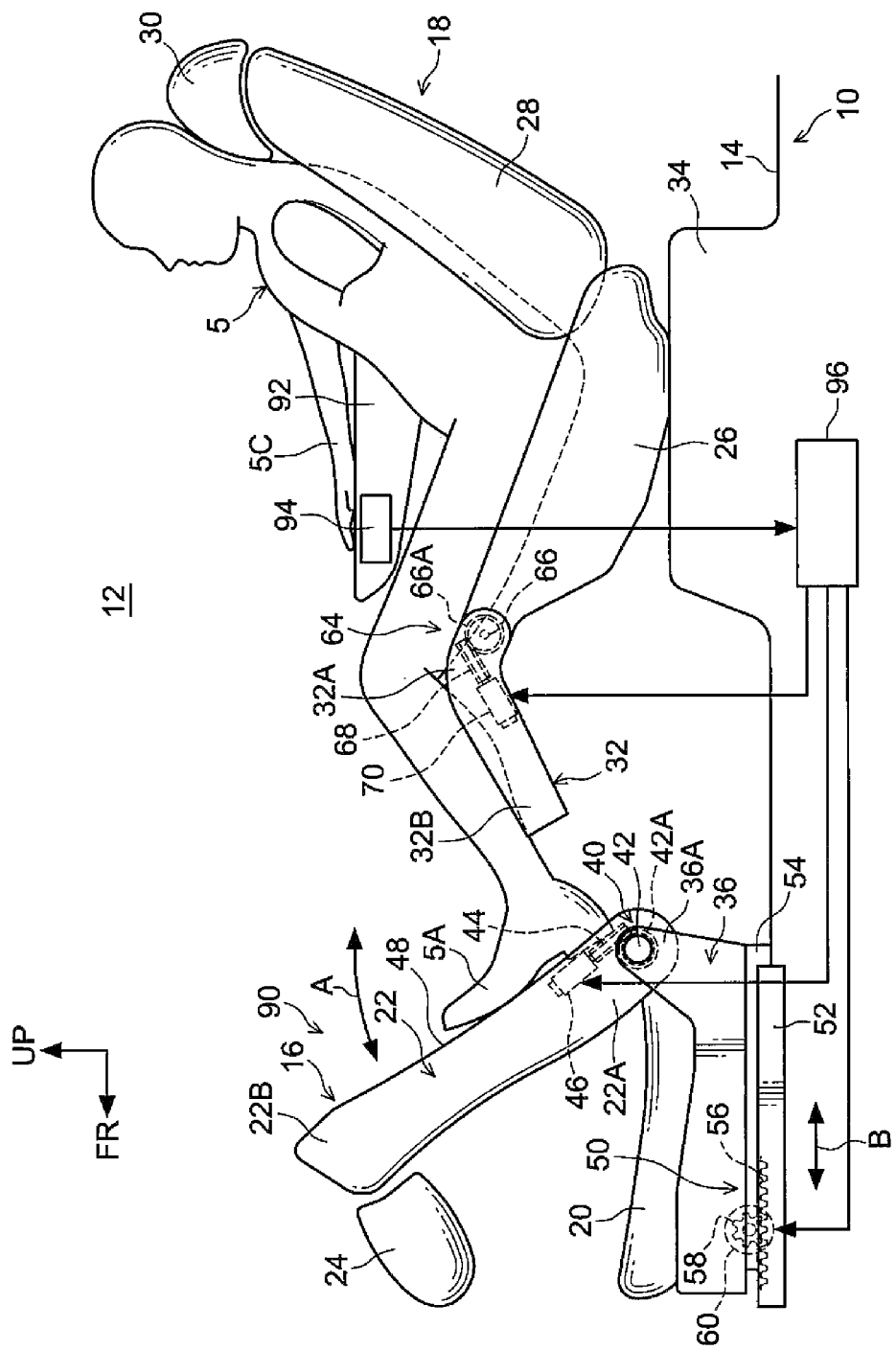
FIG. 4 is a side view illustrating an overall configuration of a vehicle footrest system according to a third exemplary embodiment, showing a state in which the seatback of a front seat is being used as a footrest section.

Explanation follows regarding a third exemplary embodiment of a vehicle footrest system according to the present invention, with reference to FIG. 4. Note that similar configuration portions to those of the first and second exemplary embodiments are allocated the same reference numerals and further explanation is omitted.

As shown in FIG. 4, a footrest system 90 is equipped with an operation section 94 that is switch operated for pivoting a seatback 22 of a front seat 16 towards the vehicle front side, and a control section 96 for respectively controlling actuation of a drive section 46 for a reclining device 40, a drive section 60 for a sliding device 50 and a drive section 70 for an ottoman moving device 64, based on signals output from the operation section 94. An armrest section 92 is provided at a vehicle width direction side portion of the rear seat 18 (the vehicle center portion side), extending out from the side portion of the seatback 28 substantially horizontally towards the vehicle front side. The operation section 94 is provided on a side face of a front end portion of the armrest section 92. The occupant 5 seated on the rear seat 18 is able to place their cubital region 5C on the armrest section 92, and the occupant 5 is able to actuate the operation section 94 from a state seated in the rear seat 18.

When the switch of the operation section 94 is switched ON/OFF, an ON/OFF signal is input to the control section 96, and actuation of the drive section 46 of the reclining device 40, the drive section 60 of the sliding device 50 and the drive section 70 of the ottoman moving device 64 is controlled by the control section 96. In the present exemplary embodiment, when each of the switches of the operation section 94 is switched to an ON state actuation of the drive section 46 of the reclining device 40 is controlled by the control section 96, and the footrest section 48 of the seatback 22 is pivoted towards the vehicle front side as far as the foot-sole angle of the feet 5A of the occupant 5 seated on the rear seat 18. At the same time, actuation of the drive section 60 of the sliding device 50 is controlled by the control section 96, and the footrest section 48 of the seatback 22 is moved in the vehicle front-rear direction (for example to the vehicle front side) with respect to the rear seat 18. Moreover, configuration may be made such that actuation of the drive section 70 of the ottoman moving device 64 is controlled by the control section 96 by operating an ottoman switch of the operation section 94, such that the front edge portion 32B side of the ottoman 32 is pivoted towards the vehicle top side. When each of the switches of the operation section 94 are switched to an OFF state, actuation of the reclining device 40, the sliding device 50 and the ottoman moving device 64 is controlled by the control section 96 and the footrest section 48 of the seatback 22 and the ottoman 32 are returned to their original positions (see FIG. 2).

Such a configuration significantly enhances the ease of operation from the rear seat 18 since, while the occupant 5 is still seated in the rear seat 18, the footrest section 48 of the seatback 22 is pivoted towards the vehicle front side by switching the switch of the operation section 94 to the ON state, and for example the footrest section 48 of the seatback 22 is returned to its original position by switching the switch of the operation section 94 to the OFF state.

Note that whereas in the present exemplary embodiment the operation section 94 is provided to the armrest section 92 at a vehicle central portion side of the rear seat 18, there is no limitation thereto. For example, the operation section 94 may be provided to door trim (not shown in the drawings) of a rear side door at the vehicle width direction outside of the rear seat 18.

Configuration may also be made to enable fine adjustment of each of the devices to be made after each of the switches of the operation section 94 have been placed in an ON state and each of the devices has been actuated (after the footrest section 48 of the seatback 22 has been moved, for example, to a specific angle or specific position). For example, configuration may be made such that when feet are rested on the footrest section 48, a resistance value is read from a sensor provided to the footrest section 48 by pressing a switch on the operation section 94, and automatic adjustment is made by controlling so as to stop when the resistance value has become a specific resistance.

Explanation follows regarding a fourth exemplary embodiment of a vehicle footrest system according to the present invention, with reference to FIG. 5. Note that similar configuration portions to those of the first to the third exemplary embodiments are allocated the same reference numerals and further explanation is omitted.

Figure 5A:
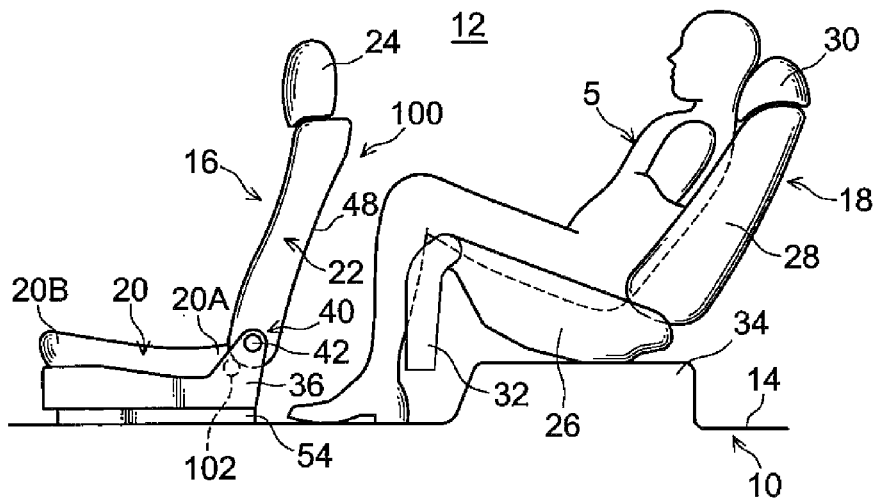
FIG. 5A is a side view illustrating an overall configuration of a vehicle footrest system according to a fourth exemplary embodiment.
Figure 5B:
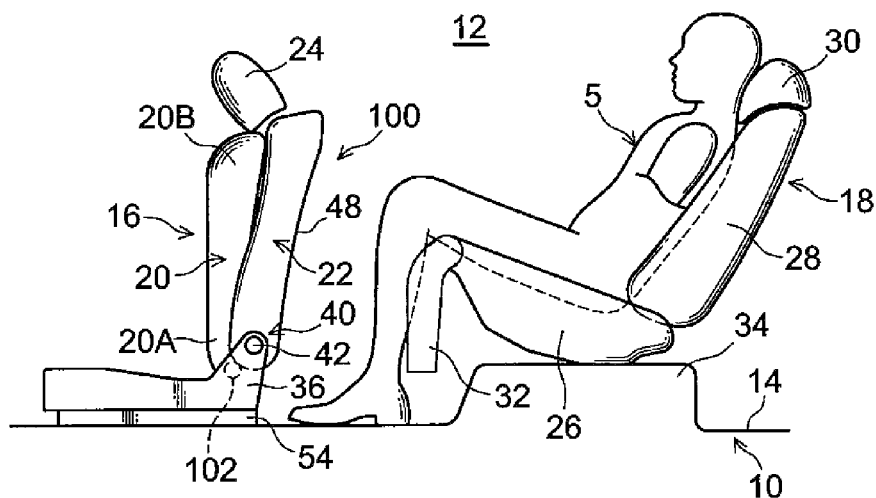
FIG. 5B is a side view illustrating a process in which a seatback of a vehicle footrest system according to the fourth exemplary embodiment is moved to the position for use as a footrest section.
Figure 5C:
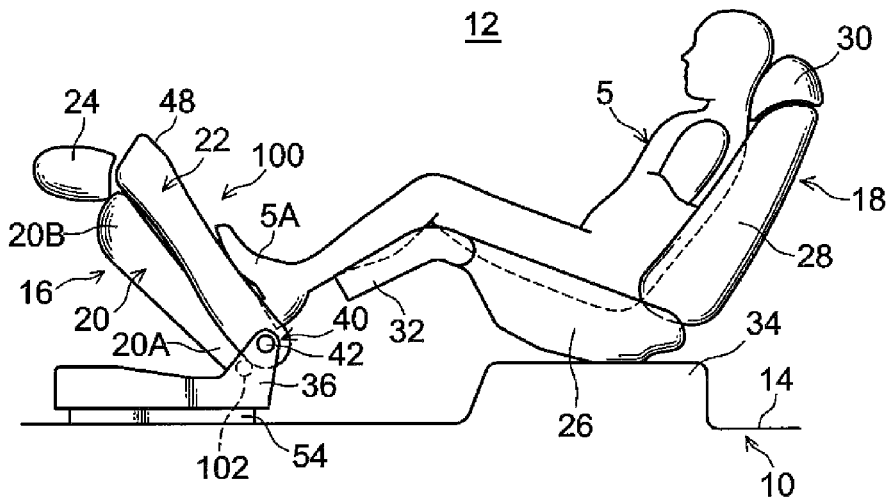
FIG. 5C is a side view illustrating a state in which a seatback of a vehicle footrest system according to the fourth exemplary embodiment has been moved to the position for use as a footrest section.

As shown in FIG. 5A to FIG. 5C, a footrest system 100 is provided with a hinge section 102 at a portion coupling between a rear end portion 20A of a seat cushion 20 of a front seat 16 and a seat cushion frame 36. The front end portion 20B of the seat cushion 20 is configured capable of being flipped up to a position of contact with the seatback 22 using the hinge section 102.

In order to use the footrest section 48 of the seatback 22, as shown in FIG. 5B, the seat cushion 20 is flipped up to the position of contact with the seatback 22 using the hinge section 102. Then, as shown in FIG. 5C, the seatback 22 is pivoted towards the vehicle front side using the hinge section 42 of the reclining device 40, and the seat cushion 20 is pivoted towards the vehicle front side together with the seatback 22. In this state an occupant 5 seated on the rear seat 18 can rest their feet 5A on the footrest section 48 of the seatback 22. In this configuration, by rotating the seat cushion 20, the seat cushion 20 can be prevented from impinging on the vehicle width direction outer side faces of a center console as compared with a configuration in which the seat cushion 20 is simply moved towards the vehicle front side (this is particularly advantageous when the center console curves around towards the vehicle width direction outer side).

Next, explanation follows regarding a fifth exemplary embodiment of a vehicle footrest system according to the present invention, with reference to FIG. 6 to FIG. 10. Note that similar configuration portions to those of the first to the fourth exemplary embodiments are allocated the same reference numerals and further explanation is omitted.

Figure 6:
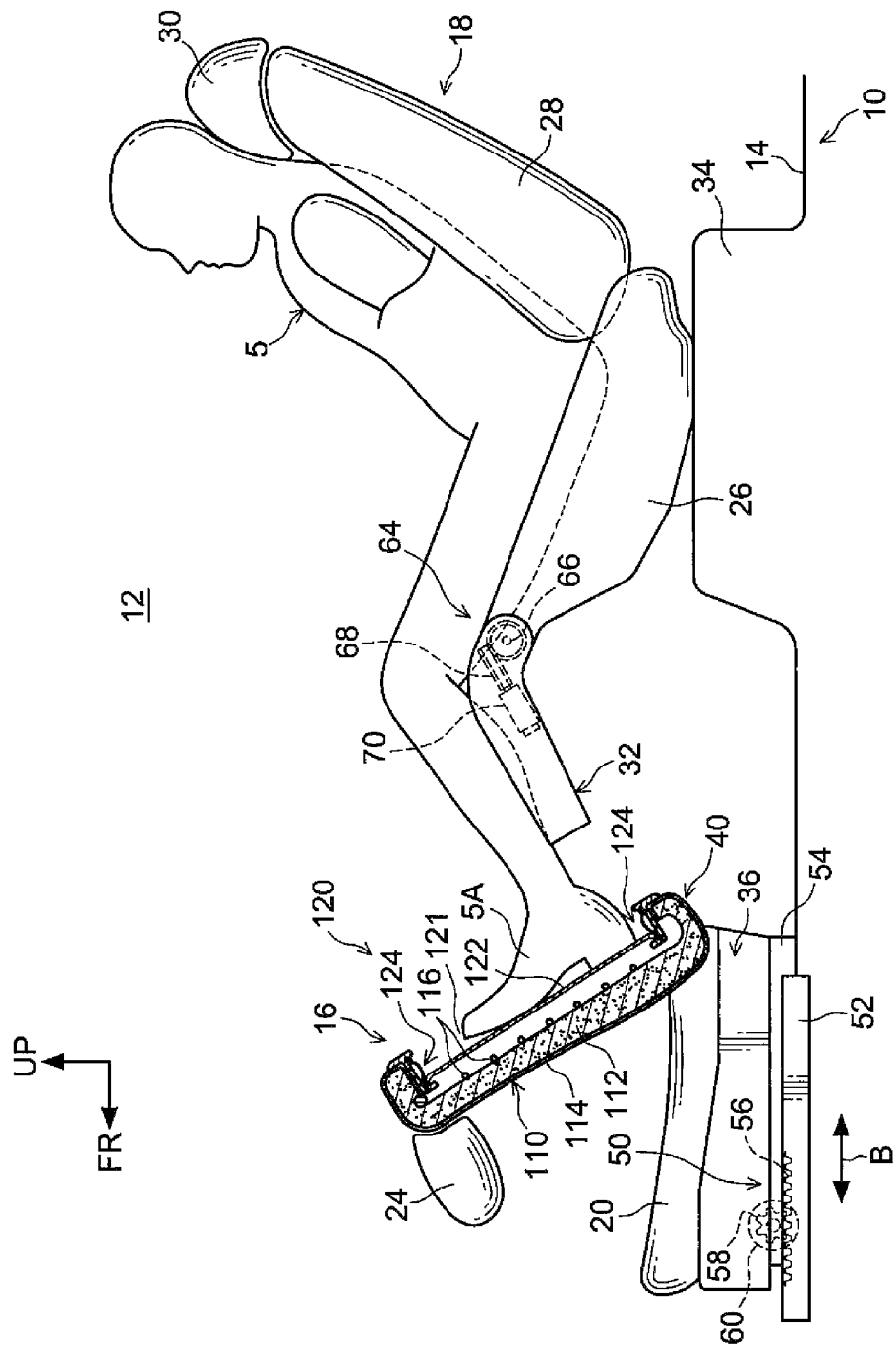
FIG. 6 is a side view illustrating an overall configuration of a vehicle footrest system according to a fifth exemplary embodiment, showing cross-section of a state in which the seatback of the front seat is being used as a footrest section.
Figure 7:
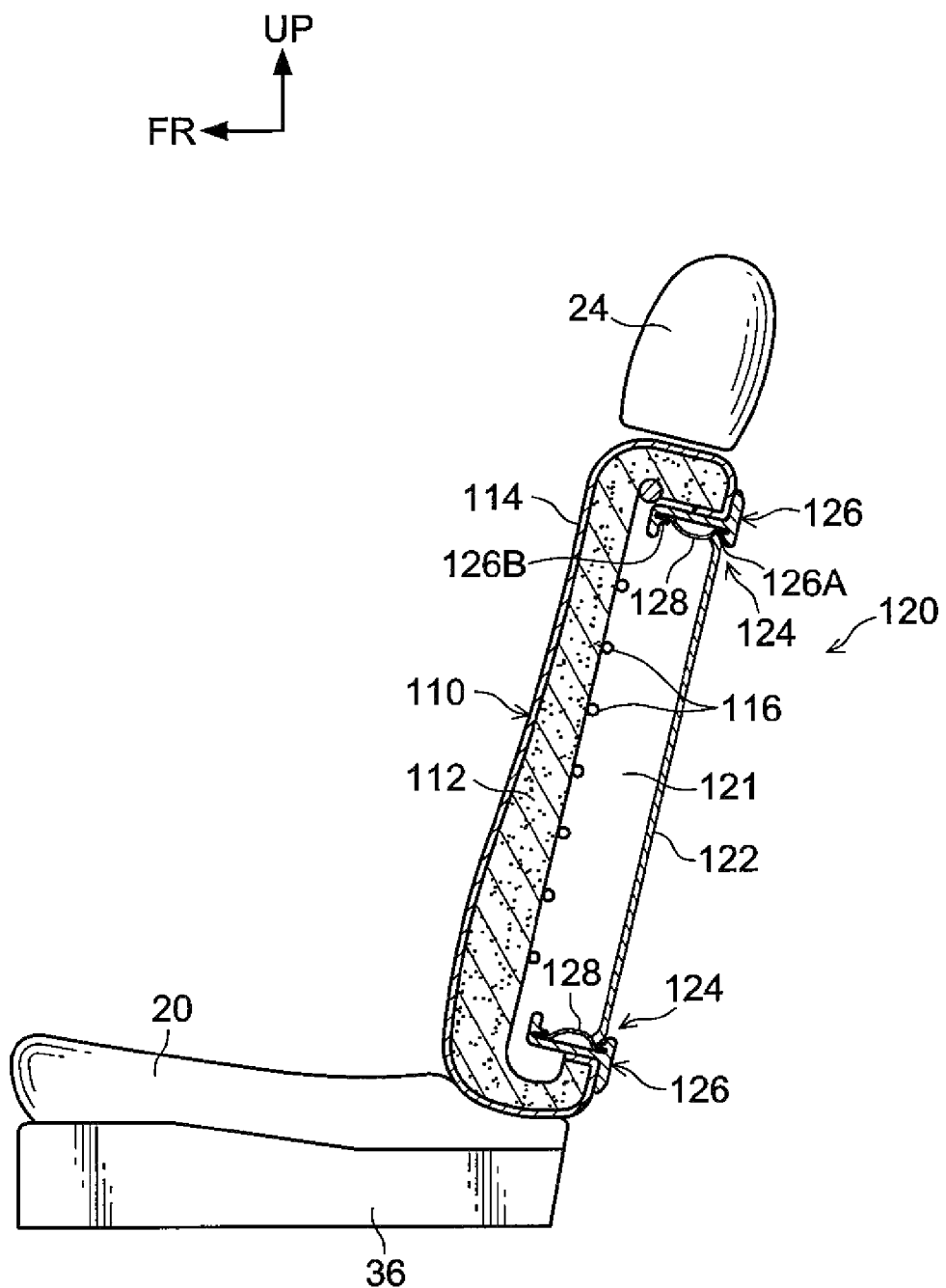
FIG. 7 is a cross-section of a vehicle footrest system according to the fifth exemplary embodiment showing normal state of the front seat.
Figure 8:
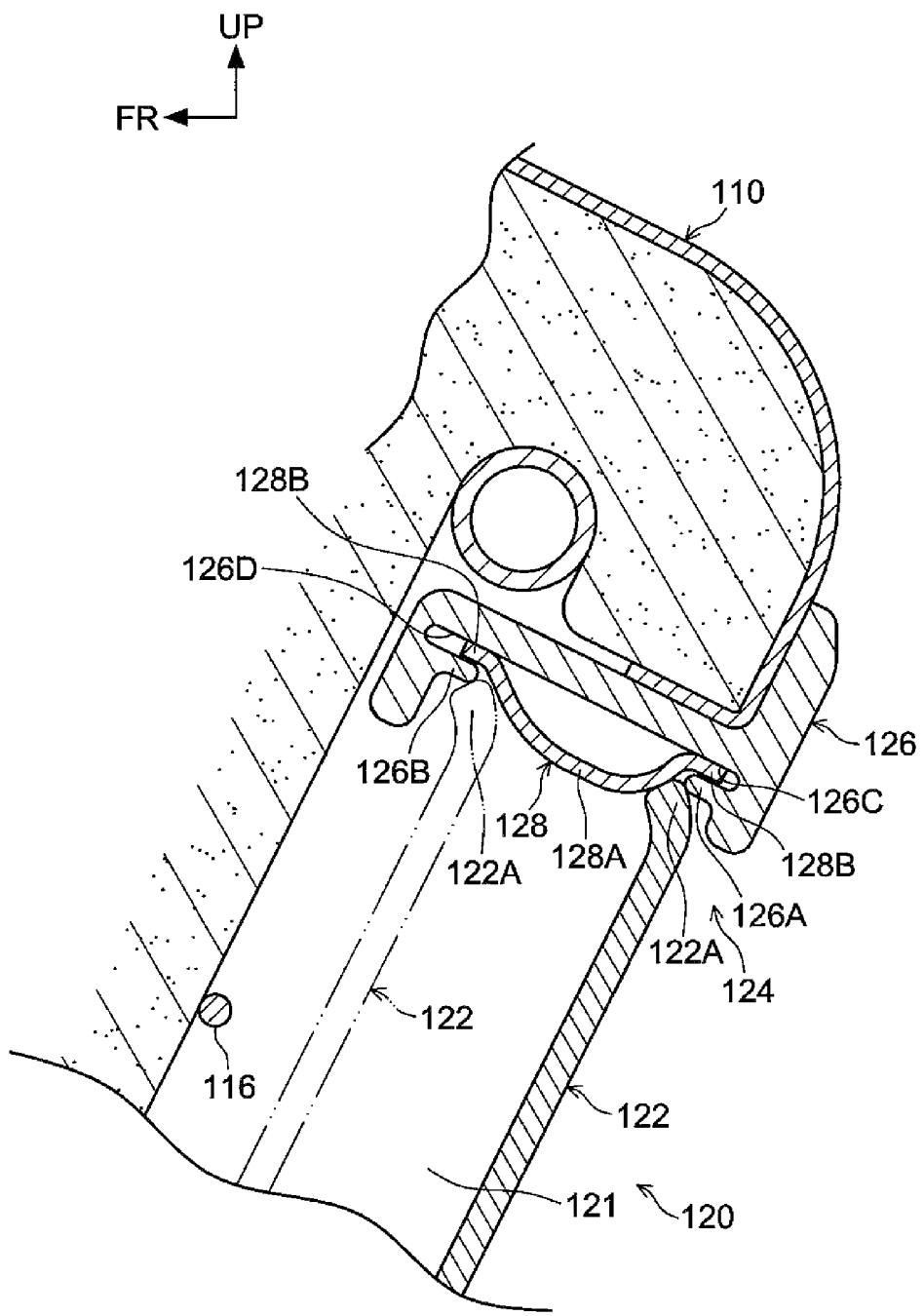
FIG. 8 is an enlarged cross-section of a portion of a footrest section of a seatback of a vehicle footrest system according to the fifth exemplary embodiment.

As shown in FIG. 6 to FIG. 8, a seatback 110 of a front seat 16 is equipped with a urethane pad 112 disposed along the vehicle top-bottom direction at the vehicle front side, a cover 114 covering the surface of the urethane pad 112, and springs 116 disposed at substantially even intervals along the vehicle top-bottom direction at the back face of the urethane pad 112.

A footrest system 120 of the present exemplary embodiment is equipped with a recess shaped portion 121 formed such that the back face of the seatback 110 of the front seat 16 dips in towards the vehicle front side, a back board 122 serving as a footrest section supported so as to be capable of moving inside the recess shaped portion 121 in the vehicle front-rear direction, and a movable section 124 for moving the back board 122 in the vehicle front-rear direction. The recess shaped portion 121 is formed at the vehicle rear side of the springs 116 disposed on the back face of the urethane pad 112. A vehicle front-rear direction gap is accordingly provided between the back board 122 and the springs 116, in a configuration such that the urethane pad 112 and the springs 116 are capable of bowing deformation towards the vehicle rear side when an occupant 7 is seated in the front seat 16 (see FIG. 10). In order to user the seatback 110 as a foot rest, no occupant may be seated in the front seat 16 since it is a prerequisite that the seatback 110 is tilted towards the vehicle front side, and the space (the recess shaped portion 121) on the vehicle rear side of the springs 116 is wasted in a configuration not provided with the back board 122. Therefore, a configuration is achieved in which the back board 122 is moved to the springs 116 side (the vehicle front side) inside the recess shaped portion 121 in order to effectively utilize the space to the vehicle rear direction side of the springs 116.

The movable section 124 is provided respectively to the top end portion and the bottom end portion of the back board 122. The movable section 124 is equipped with guide members 126 that guide the back board 122 and leaf springs 128 provided to the guide members 126 that retain the back board 122 in specific movement positions in the vehicle front-rear direction.

As shown in FIG. 8, the guide member 126 on the top end portion side of the back board 122 is equipped with a rear end restricting portion 126A that makes contact with an edge portion 122A of the back board 122 at the vehicle rear end portion and restricts further movement of the back board 122 towards the vehicle rear side, and a front end restricting portion 126B that makes contact with the edge portion 122A of the back board 122 at the vehicle front end portion and restricts further movement of the back board 122 towards the vehicle front side. Groove portions 126C, 126D are provided facing each other above the rear end restricting portion 126A and the front end restricting portion 126B. The leaf springs 128 are equipped with curved portions 128A that project out towards the vehicle bottom side with a substantially hat shaped profile in a cross-section taken along the vehicle front-rear direction, and end portions 128B at the vehicle front-rear direction sides respectively inserted into the groove portions 126C, 126D. The guide members 126 and the leaf springs 128 at the bottom end portion side of the back board 122 are configured so as to be top-bottom symmetrical to the guide members 126 and the leaf springs 128 at the top end portion side of the back board 122.

The back board 122 is capable of moving between a position in contact with the rear end restricting portions 126A of the guide members 126 and a position in contact with the front end restricting portions 126B of the guide members 126 by deforming the curved portions 128A of the leaf springs 128 in the vehicle top-bottom direction and riding over the curved portions 128A.

Explanation follows regarding operation and advantageous effects of the present exemplary embodiment.

In the normal state of the front seat 16 (the state in which the back board 122 is not being used as a footrest), as shown in FIG. 7 and FIG. 8, the edge portions 122A of the back board 122 are pressed by the curved portions 128A of the leaf springs 128 so as to make contact with the rear end restricting portion 126A of the guide members 126, and the back board 122 is retained at the vehicle rear end side of the seatback 110.

Figure 9:
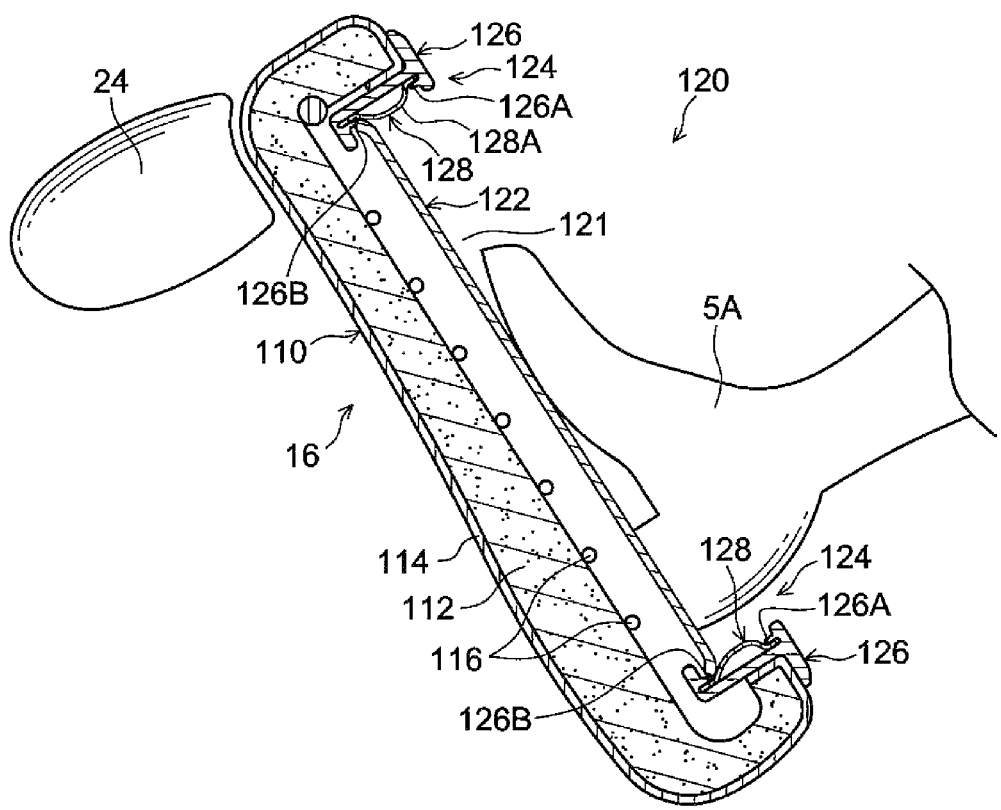
FIG. 9 is a cross-section illustrating a seatback of a front seat in a vehicle footrest system according to the fifth exemplary embodiment, showing a state of use as a footrest section.

However, when using the back board 122 as a footrest, as shown in FIG. 6 and FIG. 9, in a state in which the seatback 110 is tilted (pivoted) towards the vehicle front side by the reclining device 40 (see FIG. 1), the occupant 5 seated in the rear seat 18 presses the back board 122 towards the vehicle front side with their feet 5A. The back board 122 thereby deforms the curved portions 128A of the leaf springs 128 in the vehicle top-bottom direction, rides over the curved portion 128A and moves to the position in contact with the front end restricting portions 126B of the guide members 126. The back board 122 is pressed by the curved portions 128A due to the resilient restoration force of the leaf springs 128, and retained in a position in contact with the front end restricting portions 126B of the guide members 126.

In the footrest system 120, the legroom for the occupant 5 is increased by using the back board 122 as a footrest by moving the back board 122 towards the vehicle front side. The distance from the seated position of the occupant 5 seated on the rear seat 18 to the feet 5A position on the back board 122 is accordingly prevented from becoming too short. A comfortable posture can thereby be maintained due to being able to provide ample distance from the seated position of the occupant 5 to the feet 5A position on the back board 122.

Figure 10:
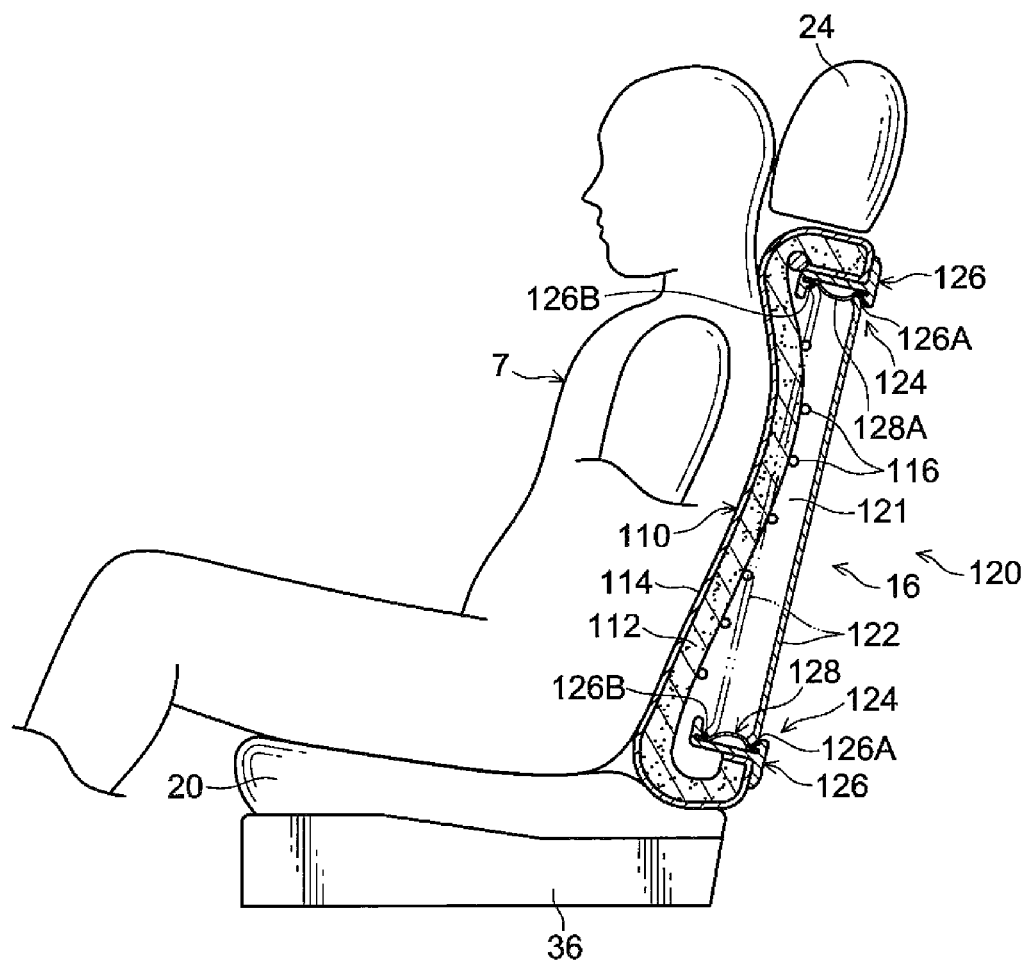
FIG. 10 is a cross-section illustrating a seated state of an occupant in a front seat of a vehicle footrest system according to the fifth exemplary embodiment.

As shown in FIG. 10, when the seatback 110 is in a state pivoted by the reclining device 40 (see FIG. 1) to its original position on the vehicle rear side, when the occupant 7 sits on the front seat 16, the springs 116 undergo bowing deformation towards the vehicle rear side together with the urethane pad 112. When this occurs, the back board 122 is pressed by the springs 116, deforms the curved portions 128A of the leaf springs 128 in the vehicle top-bottom direction, rides over the curved portions 128A, and moves to a position in which the back board 122 makes contact with the rear end restricting portions 126A of the guide members 126. The back board 122 can thus be returned to its original position at the vehicle rear end side of the seatback 110 by movement of the occupant 7 sitting in the front seat 16.

Note that while in the present exemplary embodiment the back board 122 is moved back to its original position at the vehicle rear end side of the seatback 110 by the occupant 7 sitting in the front seat 16, there is no limitation thereto. For example, the back board 122 may be manually returned to its original position at the vehicle rear end side by providing a handle to the back board 122.

Figure 11:
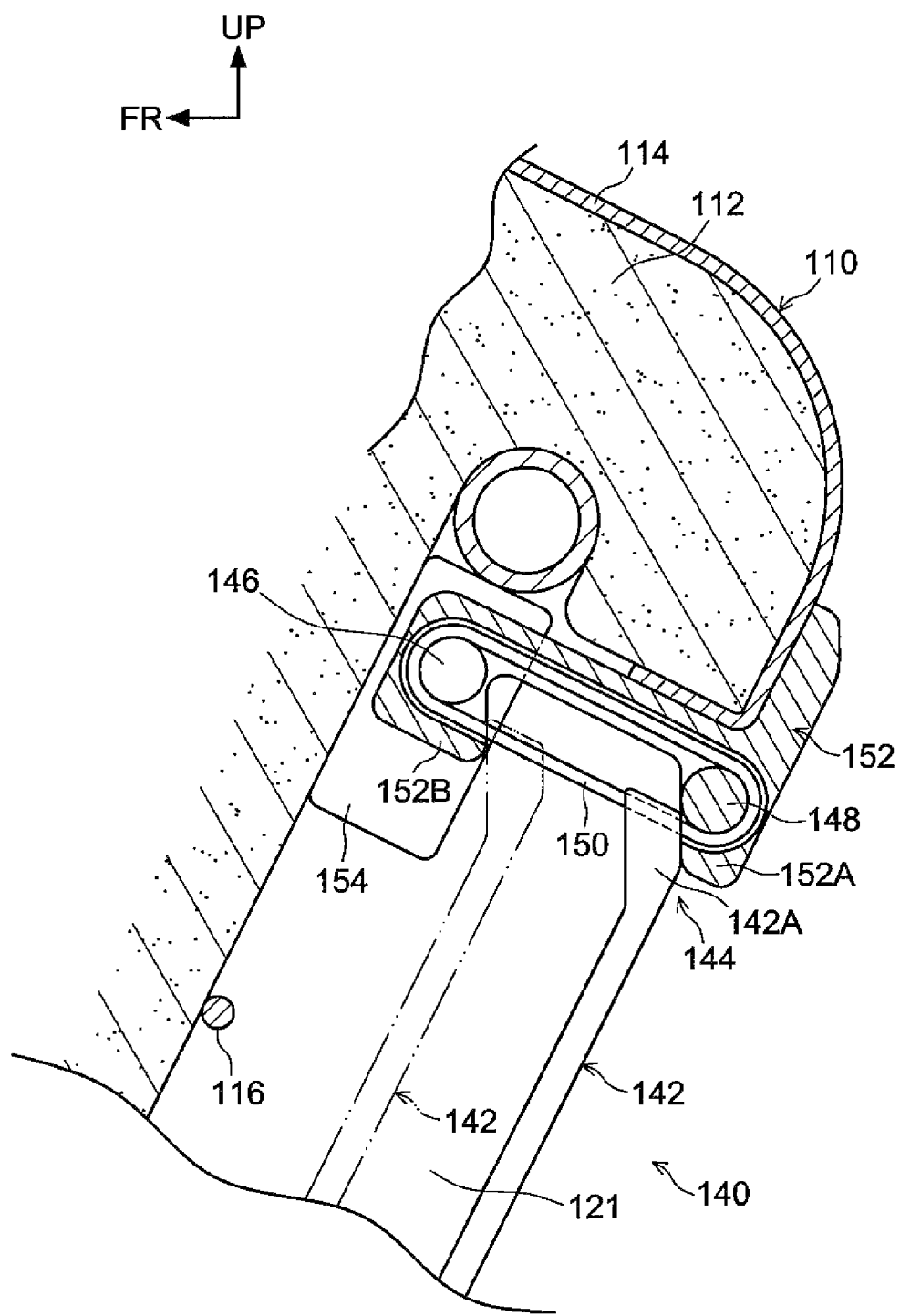
FIG. 11 is an enlarged cross-section of a portion of a footrest section of a seatback of a vehicle footrest system according to a sixth exemplary embodiment.

Explanation follows regarding a sixth exemplary embodiment of a vehicle footrest system according to the present invention, with reference to FIG. 11. Note that similar configuration portions to those of the first to the fifth exemplary embodiments are allocated the same reference numerals and further explanation is omitted.

As shown in FIG. 11, a footrest system 140 is equipped with a back board 142 serving as a footrest section and provided to the back face of a seatback 110 of a front seat 16 so as to be capable of moving in the vehicle front-rear direction, and a movable section 144 that moves the back board 142 in the vehicle front-rear direction. The movable section 144 is equipped with endless belts 150 entrained around two rollers 146, 148, a support member 152 that rotatably supports the rollers 146, 148, and a drive section 154 that rotates the roller 146. An edge portion 142A of the back board 142 is fixed to the belts 150, in a configuration such that the back board 142 moves in the vehicle front-rear direction by moving the belts 150 in a circulating direction by rotating the roller 146. While not shown in the drawings, a movable section 144 is also provided at the bottom end portion of the back board 142 in a configuration with top-bottom symmetry.

In the footrest system 140, the belts 150 are moved in the circulating direction by an operation section, not shown in the drawings, for actuating the drive section 154, and the back board 142 is moved in the vehicle front-rear direction. The back board 142 is moved between a position in contact with a rear end portion 152A of the support member 152 and a position in contact with a front end portion 152B of the support member 152. As illustrated by the double dot intermittent line in FIG. 11, when using the back board 142 as a footrest, the back board 142 is moved to the vehicle front side and hence the legroom of the occupant 5 is increased. A comfortable posture can accordingly be maintained since ample separation can be provided from the seated position of the occupant 5 seated on the rear seat 18 (see FIG. 6) to the feet 5A positioned on the back board 142.

Figure 12:
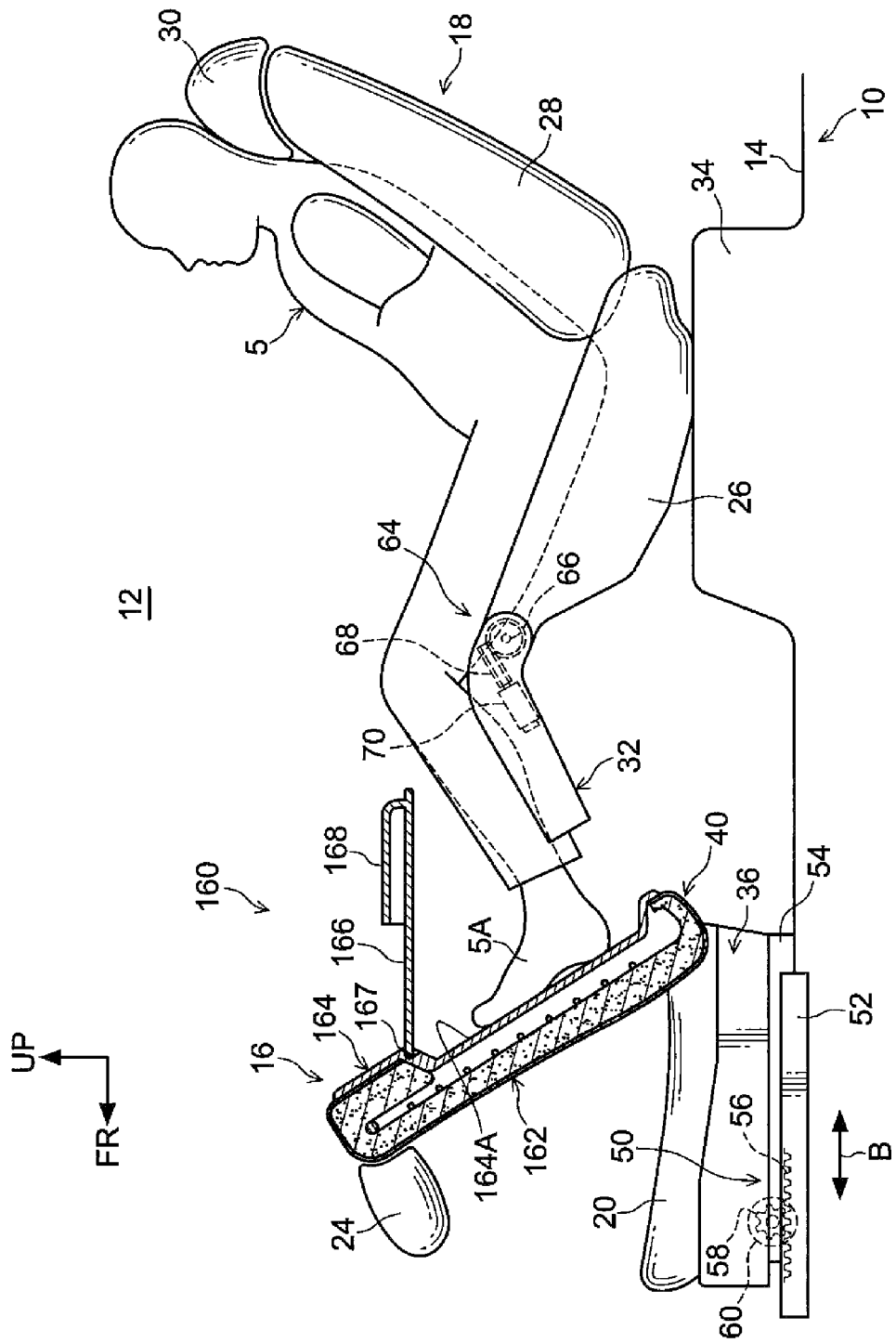
FIG. 12 is a side view illustrating an overall configuration of a vehicle footrest system according to a seventh exemplary embodiment, illustrating a cross-section of a seatback of a front seat in a state of use as a footrest section.
Figure 13:
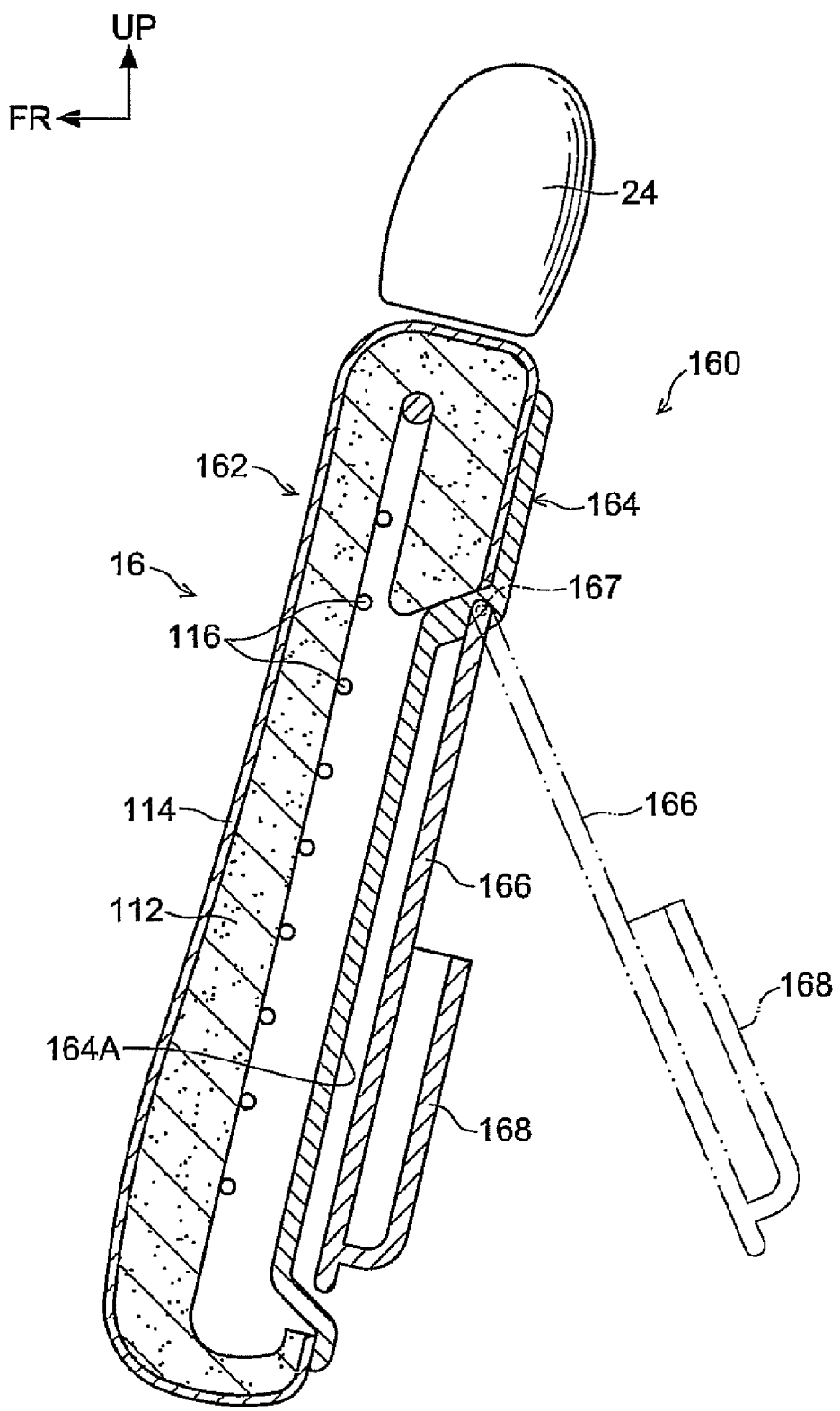
FIG. 13 is a cross-section illustrating a seatback of a front seat of a vehicle footrest system according to the seventh exemplary embodiment.

Explanation follows regarding a seventh exemplary embodiment of a vehicle footrest system according to the present invention, with reference to FIG. 12 and FIG. 13. Note that similar configuration portions to those of the first to the sixth exemplary embodiments are allocated the same reference numerals and further explanation is omitted.

As shown in FIG. 12 and FIG. 13, a footrest system 160 is equipped with a back board 164 serving as a footrest section attached to the back face of a seatback 162 of a front seat 16, and a cover member 166 provided to a top end portion of the back board 164 so as to be capable of pivoting. An indented portion 164A is provided dipping in towards the vehicle front side in the back board 164. The cover member 166 is supported so as to be capable of pivoting about a shaft portion 167 provided at a vehicle top edge portion of the indented portion 164A. The cover member 166 pivots between a stored position covering the indented portion 164A of the back board 164 (the solid line position in FIG. 13) and an open position securing space for feet 5A to be inserted into the indented portion 164A of the back board 164 (the position in FIG. 12). The back board 164 is configured so as to be retained in the open position by providing a retaining mechanism to the shaft portion 167 for retaining at a specific open position. A pocket 168 opening towards the vehicle top side is provided in the back face of the cover member 166.

As shown in FIG. 12, when the occupant 5 seated on the rear seat 18 is using the back board 164 as a footrest, the bottom end portion of the cover member 166 is in a pivoted state to the open position on the vehicle top side, and the feet 5A are inserted into the indented portion 164A of the back board 164.

As shown in FIG. 13, when the back board 164 is not being used as a footrest (the normal state), the cover member 166 is pivoted to the stored position covering the indented portion 164A of the back board 164.

In the thus configured footrest system 160, when the back board 164 is used at a footrest, even when the feet 5A of the occupant 5 are positioned directly alongside the seat at the side of the front seat 16 (for example the driver's seat) or diagonally towards the vehicle front side due to moving the front seat 16 towards the vehicle front side, the feet 5A are not readily seen due to the cover member 166, enhancing the aesthetic appeal. Thus when the back board 164 is used as a footrest, there is no longer a need to worry about the occupant of the seat at the side of the front seat 16 (for example the driver's seat). The position of the feet 5A is also rendered not readily seen from outside the vehicle (window). Moreover, since dissipation of smell is suppressed by the cover member 166, shoes can be removed and the feet 5A can be rested on the back board 164 without worrying about the occupant of the seat at the side of the front seat 16 (for example the driver's seat). The comfort of the back board 164 when used as a footrest is thereby enhanced.

When the back board 164 is not being used as a footrest (in the normal state), the indented portion 164A of the back board 164 is closed off by the cover member 166, and so even if the back board 164 is soiled, the aesthetic appeal is enhanced since the indented portion 164A is not exposed. It is necessary to remove the pocket in a configuration not provided with the cover member 166 and with the back board exposed, however providing the cover member 166 eliminates the need to remove the pocket 168.

Figure 14:
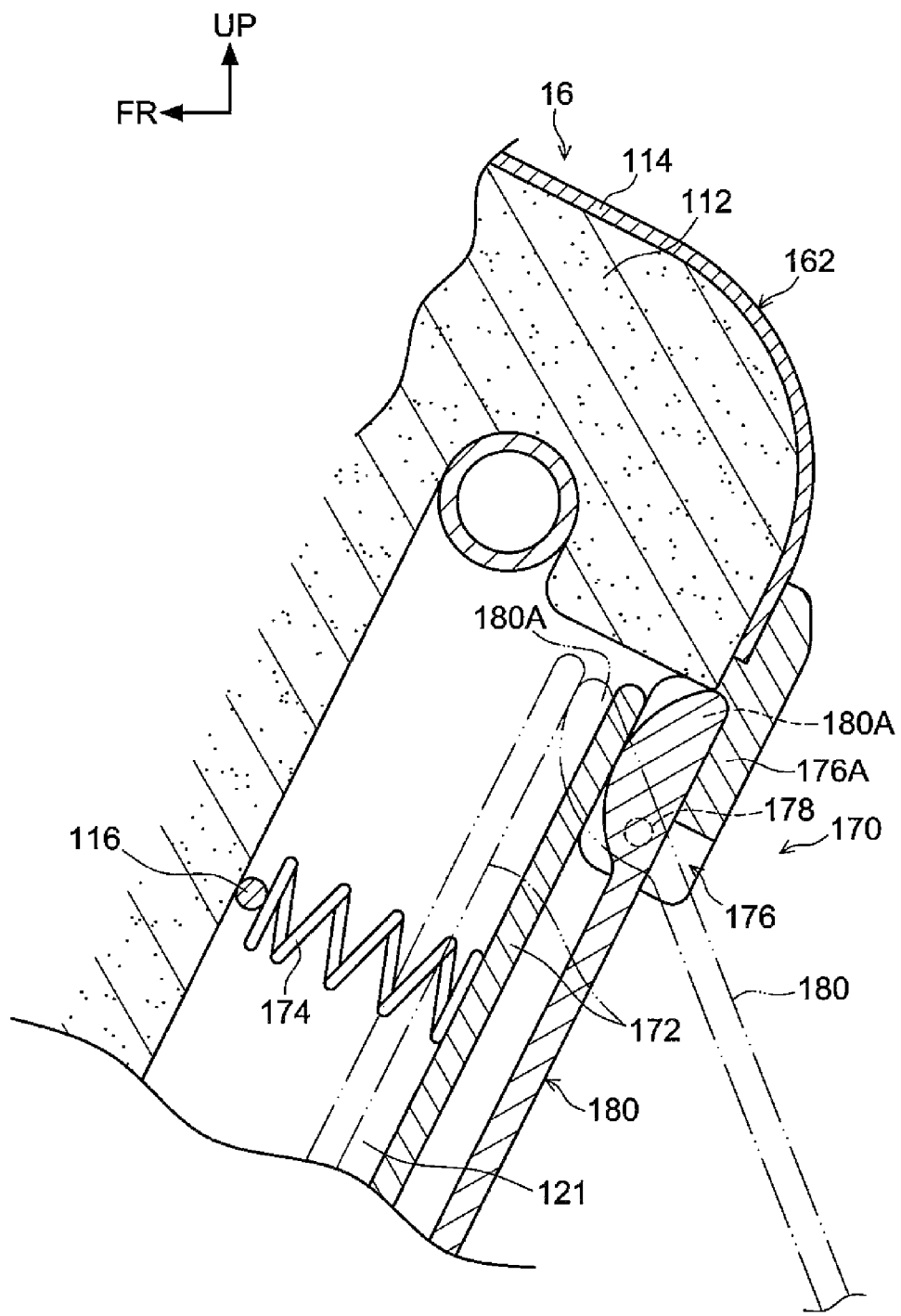
FIG. 14 is a partial cross-section illustrating a seatback of a front seat of a vehicle footrest system according to an eighth exemplary embodiment.

Explanation follows regarding an eighth exemplary embodiment of a vehicle footrest system according to the present invention, with reference to FIG. 14. Note that similar configuration portions to those of the first to the seventh exemplary embodiments are allocated the same reference numerals and further explanation is omitted.

As shown in FIG. 14, a footrest system 170 includes a back board 172 serving as a footrest section provided to a back face of a seatback 162 of a front seat 16 so as to be movable in the vehicle front-rear direction, coil springs 174 serving as biasing members for biasing the back board 172 towards the vehicle rear side, and a cover member 180 supported so as to be capable of pivoting about a shaft portion 178 of a support member 176 disposed on the back face of the seatback 162.

A cam 180A extending further towards the vehicle top side than the shaft portion 178 is provided at a top end portion of the cover member 180. The vehicle rear end portion of the support member 176 is provided with a restricting portion 176A that restricts, via the cam 180A, movement of the back board 172 towards the vehicle rear side, due to the cam 180A contacting the restricting portion 176A in a closed state of the cover member 180.

As shown in FIG. 14 by the double dot intermittent lines, when the back board 172 is used as a footrest, when the bottom end portion of the cover member 180 is pulled up to the position of use (the cover member 180 is opened about the shaft portion 178), the cam 180A pivots towards the vehicle front side to accompany the opening action of the cover member 180, moving the back board 172 towards the vehicle front side against the force of the coil springs 174.

In the thus configured footrest system 170, when the back board 172 is used as a footrest, the back board 172 is coupled to the opening action of the cover member 180 and moves to the vehicle front side, increasing the legroom for the occupant 5 (see FIG. 12).

Note that while in the present exemplary embodiment the cover member 180 is opened manually, configuration may be made with a drive section provided to electrically move the cover member 180 and the back board 172 to specific usage and storage position by switching a switch of an operating section ON/OFF.

Figure 15:
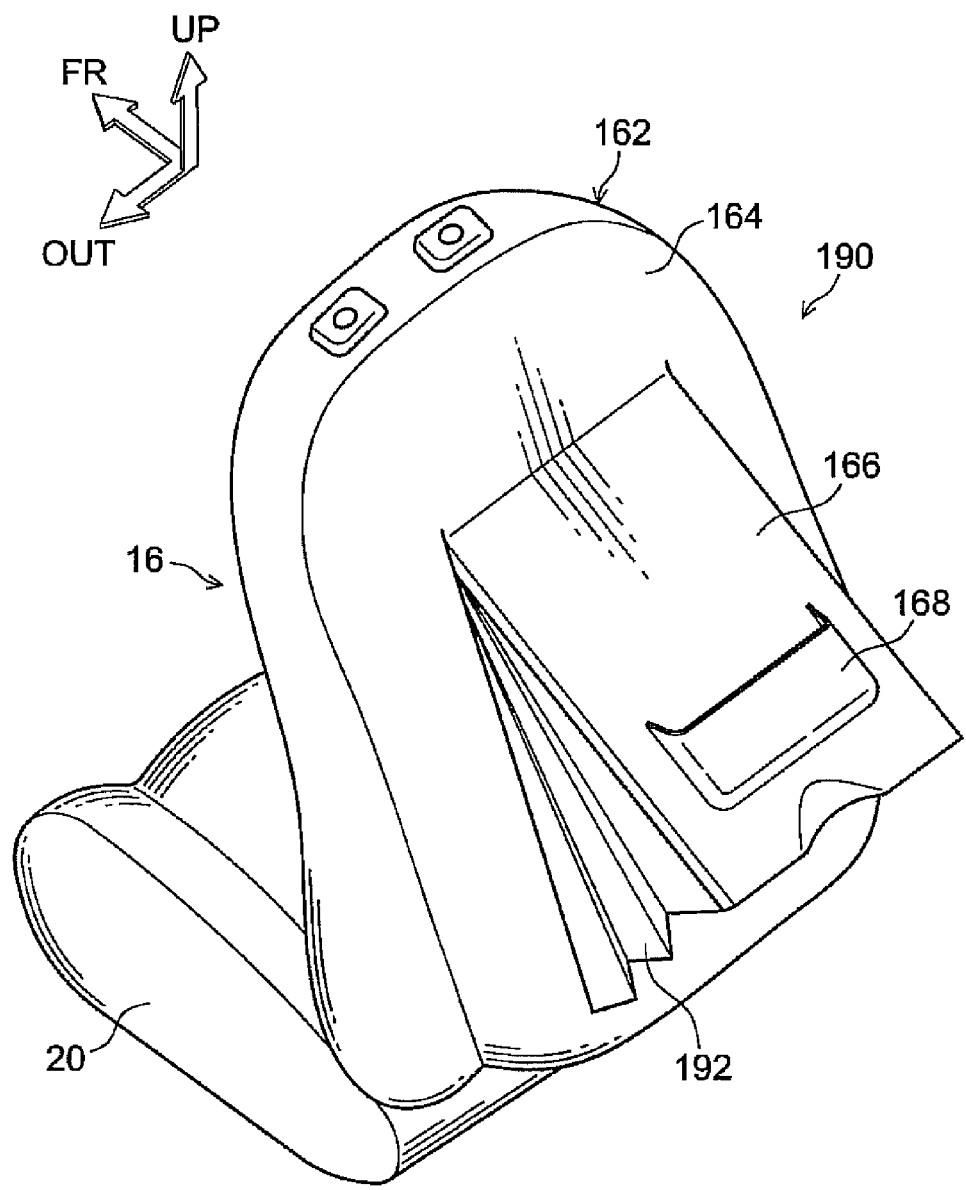
FIG. 15 is a perspective view as seen from the back face side of a front seat of a vehicle footrest system according to a ninth exemplary embodiment.

Explanation follows regarding a ninth exemplary embodiment of a vehicle footrest system according to the present invention, with reference to FIG. 15. Note that similar configuration portions to those of the first to the eighth exemplary embodiments are allocated the same reference numerals and further explanation is omitted.

As shown in FIG. 15, a footrest system 190 is equipped with a cover member 166 supported so as to be capable of pivoting at a back board 164 on the back face of a seatback 162 of a front seat 16, and concertina shaped side cover portions 192 attached between both vehicle width direction side edges of the cover member 166 and the back board 164. When the cover member 166 is opened, the concertina shaped portions of the side cover portions 192 open out, and when the cover member 166 is closed, the concertina shaped portions of the side cover portions 192 fold up.

By providing the side cover portions 192 between the side edges of the cover member 166 and the back board 164, the feet 5A resting on the back board 164 are not readily seen by the occupant of the seat to the side of the front seat 16 (for example the driver's seat), enhancing the aesthetic appeal.

Figure 16:
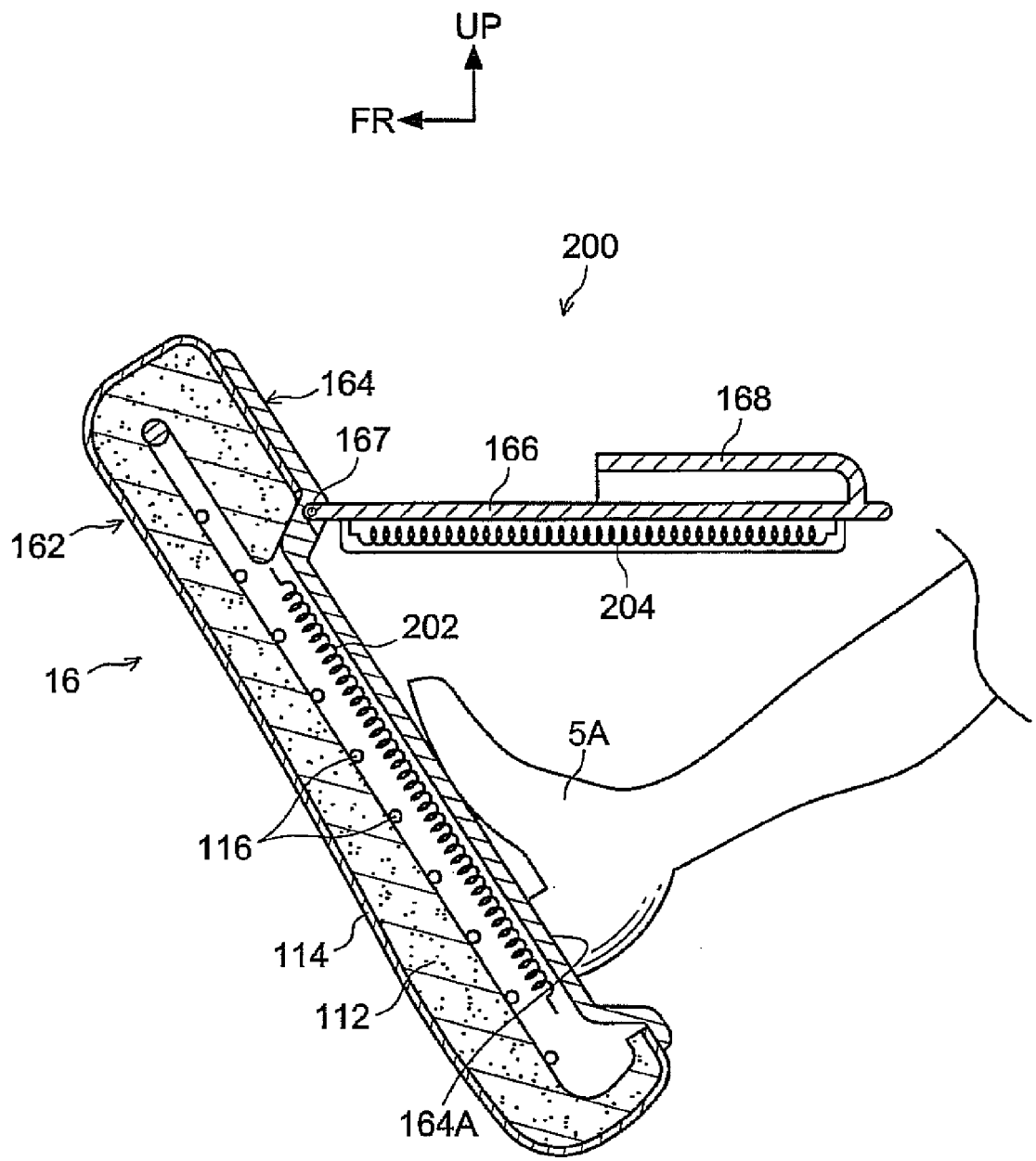
FIG. 16 is a cross-section illustrating a seatback of a front seat of a vehicle footrest system according to a tenth exemplary embodiment.

Explanation follows regarding a tenth exemplary embodiment of a vehicle footrest system according to the present invention, with reference to FIG. 16. Note that similar configuration portions to those of the first to the ninth exemplary embodiments are allocated the same reference numerals and further explanation is omitted.

As shown in FIG. 16, a footrest system 200 includes a heater 202 attached to the back face (the vehicle front side) of a back board 164 of a seatback 162 of a front seat 16, and a heater 204 attached to the back face (the vehicle front side) of a cover member 166. When resting feet 5A on the back board 164, the feet 5A can be warmed by passing electricity through the heaters 202, 204. The warming effect is particularly enhanced by removing shoes and resting the feet 5A on the back board 164.

In the present exemplary embodiment, the heaters 202, 204 are provided to both the back board 164 and the cover member 166, however configuration may be made with a heater provided to only one out of the back board 164 or the cover member 166.

When the heaters 202, 204 are provided to a configuration provided with the side cover portions 192 at both vehicle width direction sides of the cover member 166, as shown in FIG. 15, the portion surrounded by the cover member 166, the side cover portions 192 at the two vehicle width direction sides, and the back board 164 can be caused to act as a hot box, and the warming effect to the feet 5A resting on the back board 164 is enhanced.

Figure 17:
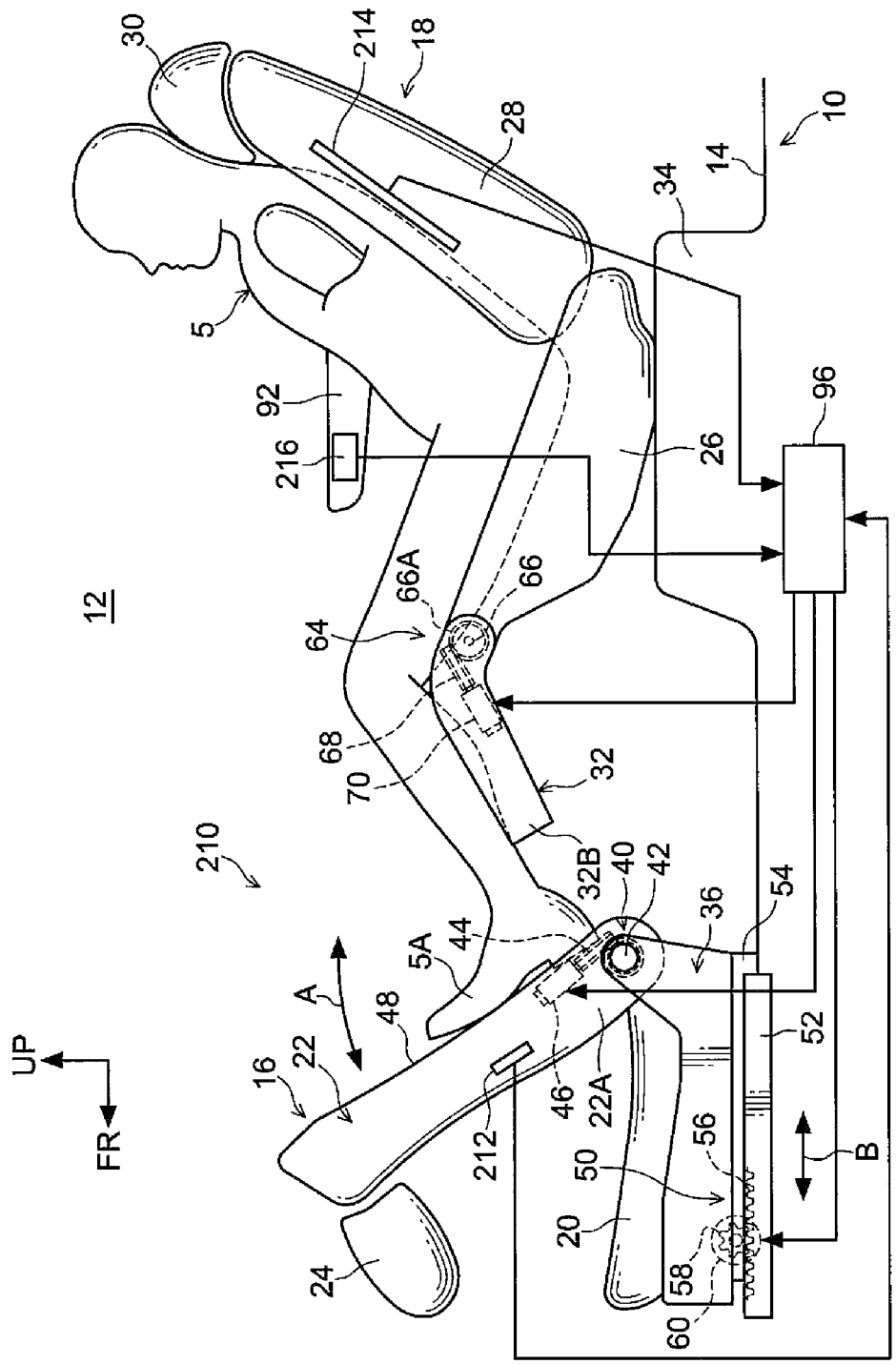
FIG. 17 is a side view illustrating an overall configuration of a vehicle footrest system according to an eleventh exemplary embodiment, illustrating a seatback of a front seat in a state of use as a footrest section.

Explanation follows regarding an eleventh exemplary embodiment of a vehicle footrest system according to the present invention, with reference to FIG. 17. Note that similar configuration portions to those of the first to the tenth exemplary embodiments are allocated the same reference numerals and further explanation is omitted.

As shown in FIG. 17, a footrest system 210 is equipped with a sensor 212 (load sensor) that is provided at the inside of a seatback 22 of a front seat 16 and detects load acting on the seatback 22, and a sensor 214 (load sensor) that is provided along the top-bottom direction inside a seatback 28 of a rear seat 18 and detects the frame of an occupant seated in the rear seat 18. The footrest system 210 is also equipped with an operation section 216 and a control section 96 for respectively controlling actuation of a drive section 46 for a reclining device 40 and a drive section 60 for a sliding device 50, based on the frame of an occupant detected the sensor 214. The control section 96 is configured to tilt the seatback 22 using the reclining device 40 to a pre-stored specific position towards the vehicle front side, and to move the front seat 16 using the sliding device 50 to a pre-stored specific position in the vehicle front-rear direction. Plural tilt positions of the seatback 22 and plural slide positions of the front seat 16 are set based on the frame of the occupant detected by the sensor 214. Moreover, the control section 96 may also be configured such that the front edge portion 32B side of an ottoman 32 is pivoted to a pre-stored specific position towards the vehicle top side by an ottoman moving device 64 when the fact that load has acted on a footrest section 48 of the front seat 16 is detected by a sensor (not shown in the drawings).

For the sensors 212, 214, for example, body weight detection sensors respectively disposed in the front seat 16 and the rear seat 18 can be employed as load sensors.

In the present exemplary embodiment, when a switch of the operation section 216 is pressed, the frame of the occupant 5 seated in the rear seat 18 is detected by the sensor 214. Moreover, whether or not load is acting on the seatback 22 of the front seat 16 (whether or not there is an occupant seated in the front seat 16) is detected by the sensor 212. When there is no load acting on the seatback 22, the operation of the drive section 46 of the reclining device 40 is controlled by the control section 96 based on the frame of the occupant detected by the sensor 214, and the footrest section 48 of the seatback 22 is pivoted to a pre-stored specific position towards the vehicle front side. At the same time, operation of the drive section 60 of the sliding device 50 is controlled by the control section 96, and the footrest section 48 of the seatback 22 is moved to a pre-stored specific position in the vehicle front-rear direction with respect to the rear seat 18.

When the fact that load has acted on the footrest section 48 of the front seat 16 is detected by a sensor (not shown in the drawings), the control section 96 pivots the front edge portion 32B side of the ottoman 32 towards the vehicle top side to a pre-stored specific position by the ottoman moving device 64.

Configuration may be made such that when a pre-stored specific duration has elapsed without the feet 5A being rested on the footrest section 48, the control section 96 returns the footrest section 48 of the seatback 22 and the ottoman 32 to their original positions (see FIG. 2) by operating the reclining device 40, the sliding device 50 and the ottoman moving device 64. Note that such a configuration may or may not be included.

By detecting the frame of the occupant 5 seated on the rear seat 18 with the sensor 214, and by operating the reclining device 40 and the sliding device 50 to pre-stored specific positions, ease-of-operation can be enhanced for using the footrest section 48 of the seatback 22. The ease-of-operation when using the ottoman 32 is enhanced by detecting that the feet 5A have been rested on the footrest section 48 with a sensor (not shown in the drawings) and operating the ottoman moving device 64 to a pre-stored position.

Note that as a modified example of the present exemplary embodiment, configuration may be made such that, for example, an operation to tilt the footrest section 48 of the seatback 22 towards the vehicle front side is detected and the sliding device 50 and the ottoman moving device 64 are operated based on a detection signal. Configuration may be made such that by providing a slide amount measurement unit for measuring the slide amount of the front seat and the rear seat (or a separation measurement unit for measuring the separation between the front seat and the rear seat), the tilt angle of the seatback of the front seat and the slide amount of the front seat is automatically adjustable based on the frame of the occupant seated in the rear seat and the measured slide amount (or separation between the front seat and the rear seat).

Figure 18:
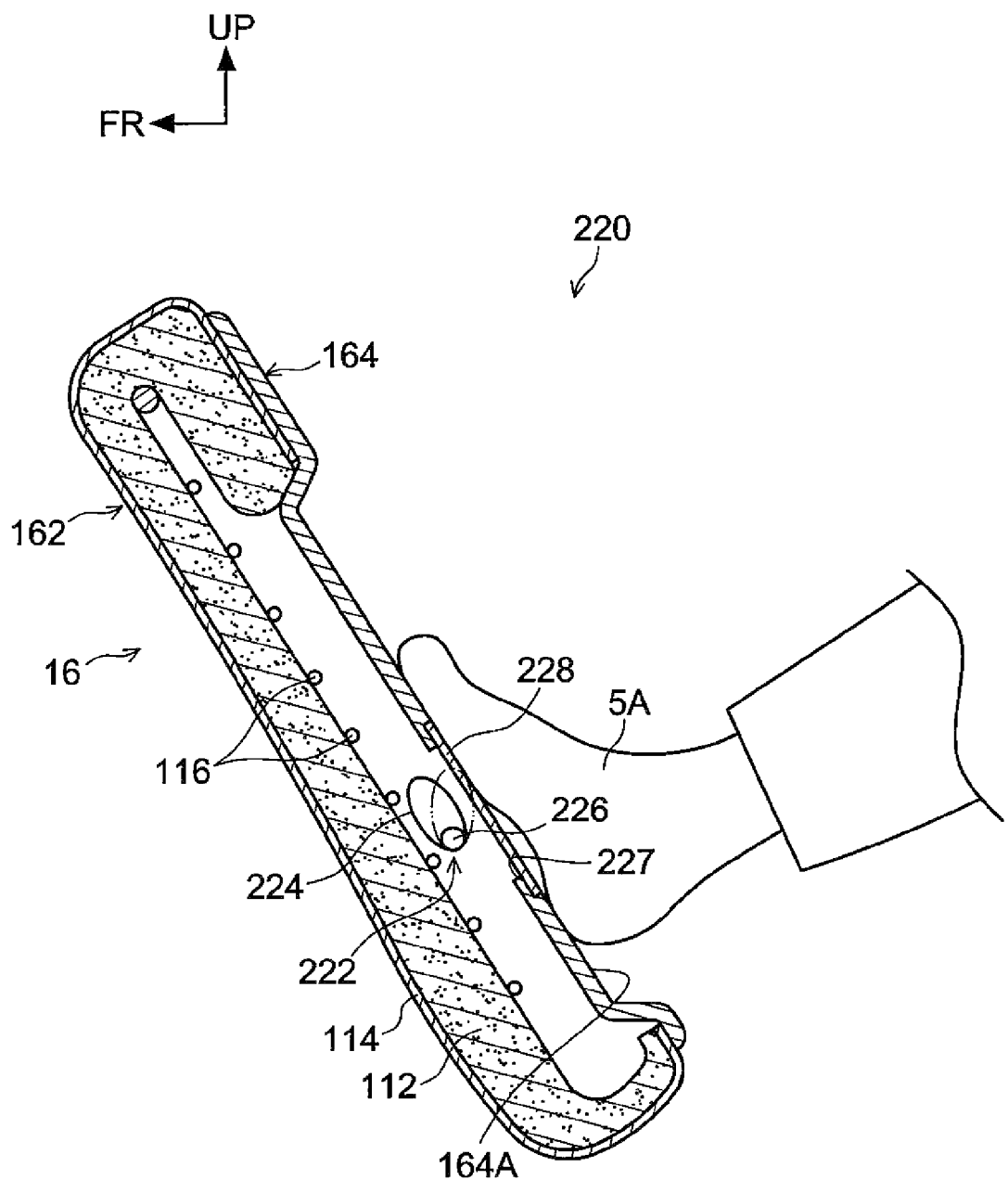
FIG. 18 is a cross-section illustrating a seatback of a front seat of a vehicle footrest system according to a twelfth exemplary embodiment.

Explanation follows regarding a twelfth exemplary embodiment of a vehicle footrest system according to the present invention, with reference to FIG. 18. Note that similar configuration portions to those of the first to the eleventh exemplary embodiments are allocated the same reference numerals and further explanation is omitted.

As shown in FIG. 18, a footrest system 220 is equipped with a massage device 222 for massaging feet 5A resting on a back board 164 provided inside a seatback 162 of a front seat 16. The massage device 222 is equipped with a substantially elliptical shaped movement section 224 and a rotation shaft 226 provided at long-axis end portion(s) of the movement section 224. An opening 227 is formed in the back board 164 of the seatback 162 in a position facing towards the movement section 224. A soft sheet member 228 is attached so as to cover the opening 227. The sheet member 228 is formed from a material such as cloth. In order to use the massage device 222, shoes are taken off and the feet 5A are rested on the back board 164. The massage device 222 also functions as a lumbar system for an occupant seated on the front seat 16.

In the footrest system 220, feet 5A resting on the back board 164 are massaged by the movement section 224 repeatedly turning about the rotation shaft 226 in a direction such that the sheet member 228 is projected out towards the vehicle rear side and in the opposite direction thereto.

Note that configuration may be made to massage by vibration using a vibrator instead of the massage device 222.

Figure 19:
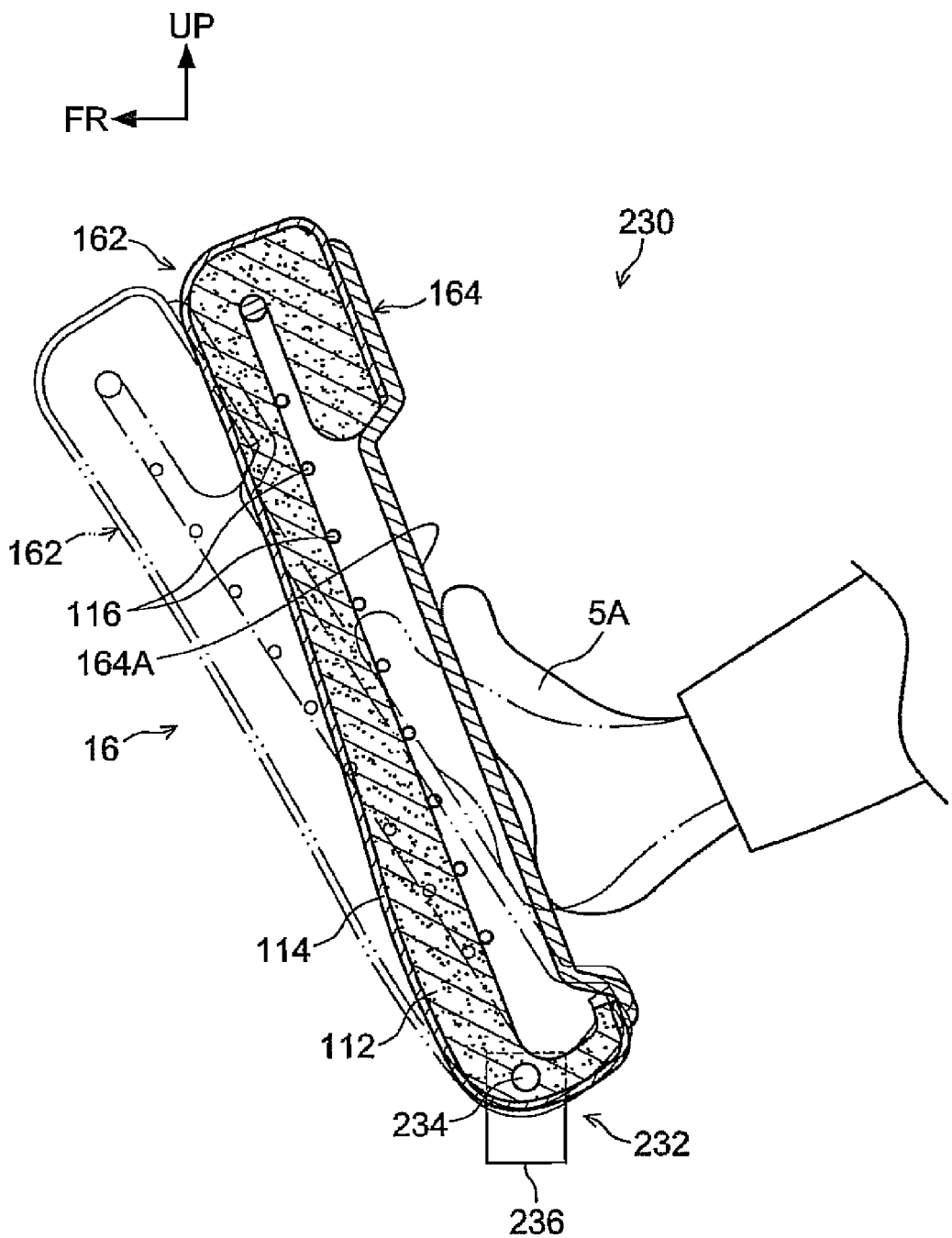
FIG. 19 is a cross-section illustrating a seat back of a front seat of a vehicle footrest system according to a thirteenth exemplary embodiment.

Explanation follows regarding a thirteenth exemplary embodiment of a vehicle footrest system according to the present invention, with reference to FIG. 19. Note that similar configuration portions to those of the first to the twelfth exemplary embodiments are allocated the same reference numerals and further explanation is omitted.

As shown in FIG. 19, a footrest system 230 is equipped with a swing device 232 provided to a bottom end portion of a seatback 162 of a front seat 16 for swinging the top portion side of the seatback 162 in the vehicle front-rear direction. The swing device 232 is equipped with a shaft portion 234 provided so as to run along the vehicle width direction at a bottom end portion of the seatback 162, and a drive section 236 for pivoting the shaft portion 234 in the vehicle front-rear direction.

In a state in which feet 5A are rested on the back board 164 of the seatback 162, when the shaft portion 234 is pivoted in the vehicle front-rear direction by the drive section 236, the top portion side of the seatback 162 swings in the vehicle front-rear direction. The ankles and vicinity of the shins can accordingly be moved when the feet 5A are in a rested state on the back board 164.

Note that while the swing device 232 is provided in the present exemplary embodiment, there is no limitation thereto. Configuration may be made such that a reclining device 40 (see FIG. 1) is also employed as the swing device to swing the top portion side of the seatback 162 in the vehicle front-rear direction.

Note that as well as the above exemplary embodiments, configuration may also be made wherein a sensor is provided for detecting that feet 5A are resting on the back board 164 of the seatback 162 and a sensor is provided in the rear seat 18 (see FIG. 1) for detecting the thigh region of an occupant, and a voice output device or display device advises an appropriate seating posture.

Note that in the above exemplary embodiments vehicle footrest systems of the present invention are provided to the front seat 16 and the rear seat 18, however there is no limitation thereto. For example, the vehicle footrest system of the present invention may be provided to any front side seat and any rear side seat that are adjacent to each other in the vehicle front-rear direction when three or more rows of seats are provided in the vehicle front-rear direction inside a vehicle compartment.

Note that the rear seat may also have a sliding and/or reclining configuration.

The invention claimed is:

1. A vehicle footrest system, comprising:
a rear side seat disposed at a vehicle compartment rear side;
a front side seat disposed at a vehicle compartment front side of the rear side seat and equipped with an upright seatback provided at a vehicle front-rear direction rear end portion of a seat cushion capable of being sat on by an occupant;
a tilting unit that tilts the seatback towards the vehicle front side with respect to the seat cushion as far as a foot-sole angle of the occupant seated in the rear side seat and retains an upper end portion of the seatback in a tilted state sloping diagonally towards the vehicle front and the vehicle top with respect to a bottom end portion of the seatback;
a footrest section provided at a back face of the seatback and provided along the back face on which to rest the feet of the occupant seated in the rear side seat; and a moving unit for moving the seatback in the vehicle front-rear direction with respect to a vehicle body floor with the seatback in a state tilted towards the vehicle front side by the tilting unit, wherein
an indented portion is provided at the footrest section into which the feet of the occupant seated in the rear side seat are inserted, and
the footrest section is equipped with a movable section that is supported in a recess shaped portion provided in the back face of the seatback so as to be capable of moving in the vehicle front-rear direction, and that forms the indented portion by moving the footrest section towards the vehicle front side in a state in which the seatback has been tilted towards the vehicle front side by the tilting unit.

2. The vehicle footrest system of claim 1, wherein the footrest section comprises a load bearing portion that supports the heels of the occupant seated in the rear side seat.

3. The vehicle footrest system of claim 1, wherein:
the tilting unit comprises a drive section that electrically operates the seatback; and
the vehicle footrest system further comprises:
an operating section that is provided at a position enabling operation by the occupant seated in the rear side seat and that actuates the tilting unit; and
a control unit that controls actuation of the tilting unit based on operation of the operating section.

4. The vehicle footrest system of claim 1, wherein a cover member is provided at the footrest section, the cover member being supported so as to be capable of opening towards the vehicle rear side from a closed state in which the footrest section is covered.

5. The vehicle footrest system of claim 4, wherein at least one of the footrest section or the cover member is provided with a heater for warming the feet of the occupant seated in the rear side seat.

6. The vehicle footrest system of claim 1, wherein the movable section is configured to move in response to a thrusting force of the occupant.

7. The vehicle footrest system of claim 1, wherein the movable section is configured to move in conjunction with an operation by the tilting unit that tilts the seatback towards the vehicle front side.

8. The vehicle footrest system of claim 1, wherein the movable section is configured to move in conjunction with an operation that opens a cover member provided at the footrest section towards the vehicle rear side from a closed state in which the footrest section is covered.

9. The vehicle footrest system of claim 1, wherein the footrest section comprises a massage unit for massaging the soles of the feet of the occupant seated in the rear side seat.

10. The vehicle footrest system of claim 1, further comprising a swing unit that swings a vehicle upper side end portion of the seatback in the vehicle front-rear direction about a pivot center at a vehicle lower side end portion of the seatback.

11. The vehicle footrest system of claim 1, further comprising:
a load sensor that is provided at the rear side seat and that detects the physique of the occupant seated in the rear side seat; and
a control unit that controls operation of the tilting unit and the moving unit based on the physique of the occupant detected by the load sensor so as to tilt the seatback towards the vehicle front side to a pre-stored specific position and so as to move the seatback with respect to the vehicle body floor to a vehicle front-rear direction pre-stored specific position.

12. The vehicle footrest system of claim 1, wherein the rear side seat comprises:

an ottoman provided at a vehicle front-rear direction front end portion of a seat cushion capable of being sat on by the occupant, the ottoman being supported such that a vehicle front side end portion of the ottoman is capable of being flipped up towards the vehicle upper side about a pivot center at a vehicle rear side end portion of the ottoman;

an ottoman moving unit that moves the vehicle front side end portion of the ottoman towards the vehicle upper side; and an ottoman control unit that controls the ottoman moving unit such that the vehicle front end portion of the ottoman is moved towards the vehicle upper side when the seatback is tilted towards the vehicle front side.

* * * * *